(12) United States Patent
Baker

(10) Patent No.: US 10,755,362 B2
(45) Date of Patent: Aug. 25, 2020

(54) ESCROW PERSONALIZATION SYSTEM

(71) Applicant: INTUIT INC., Mountain View, CA (US)

(72) Inventor: Tristan Cooper Baker, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 1008 days.

(21) Appl. No.: 14/929,126

(22) Filed: Oct. 30, 2015

(65) Prior Publication Data

US 2017/0124663 A1    May 4, 2017

(51) Int. Cl.
    *G06Q 40/02*      (2012.01)
    *G06Q 40/00*      (2012.01)
    *G06Q 30/04*      (2012.01)

(52) U.S. Cl.
    CPC .................. *G06Q 40/123* (2013.12)

(58) Field of Classification Search
    CPC ......... G06Q 40/00; G06Q 40/02; G06Q 30/04
    USPC ........................................................... 705/31
    See application file for complete search history.

(56) References Cited

U.S. PATENT DOCUMENTS

| | | | | |
|---|---|---|---|---|
| 7,539,635 | B1 * | 5/2009 | Peak | G06Q 10/00 |
| | | | | 705/31 |
| 7,636,886 | B2 * | 12/2009 | Wyle | G06F 17/30017 |
| | | | | 715/222 |
| 2004/0088233 | A1 * | 5/2004 | Brady | G06Q 40/00 |
| | | | | 705/31 |
| 2012/0109792 | A1 * | 5/2012 | Eftekhari | G06F 21/31 |
| | | | | 705/31 |

FOREIGN PATENT DOCUMENTS

JP      2002-007710 A      1/2002

OTHER PUBLICATIONS

PCT International Search Report for PCT/US2015/058504, Applicant: Intuit Inc., Form PCT/ISA/210 and 220, dated Jul. 27, 2016 (5pages).

(Continued)

*Primary Examiner* — Hai Tran
(74) *Attorney, Agent, or Firm* — DLA Piper LLP (US)

(57) ABSTRACT

Computer systems for escrowing of selected data of an online tax return preparation application for use in executing models such as predictive models to generate tax return topic rankings, which are provided to the online tax return application and displayed to a user and are personalized in that they reflect or are based on actual tax return data of the user. Escrow system components may operate independently of the online application such that small portions of a very large amount of tax return preparation data can be retrieved (e.g., periodically) from a data store maintained by the online application, and this retrieved data is cached or stored to a different data store and analyzed relative to an escrow contract specifying types of data required to trigger model execution. Upon satisfying escrow contract requirements, a corresponding model is executed, and a topic ranking is generated and provided to the online application.

32 Claims, 11 Drawing Sheets

(56) References Cited

OTHER PUBLICATIONS

PCT Written Opinion of the International Search Authority for PCT/US2015/058504, Applicant: Intuit Inc, Form PCT/ISA/237, dated Jul. 27, 2016 (11pages).
Canadian Office Action dated Dec. 11, 2019 issued in Canadian Application No. 2,994,232.
Extended European Search Report issued in EP 15907552 dated Mar. 6, 2019.
Luo et al. "Middle-Tier Database Caching for E-Business", Proceedings of the ACM Sigmod International Conference on Management of Data, Jun. 3, 2002, pp. 600-611.

* cited by examiner

ESCROW PERSONALIZATION SYSTEM

SUMMARY

Embodiments are related to computer-centric and internet-centric technologies such as preparation of electronic tax returns by an online tax return preparation application accessible by browsers executing on user computing devices, data and memory management and computing system efficiencies, user interface generation and real-time user interface adaptation and modification, interfacing with or communicating with on-line computer applications, and modular system components that can be used to implement changes to an on-line tax return preparation application without having to change code or components of the on-line tax return preparation application itself.

Embodiments also involve or are related to user interfaces generated during preparation of electronic tax returns and personalizing user interface content for particular users, personalizing tax return preparation experiences, modifying user interfaces and user experiences on the fly in real time during preparation of an electronic tax return, and adapting user interfaces in response to changes in electronic tax return data.

Embodiments also involve or are related to data escrow systems and how components of data escrow systems may operate independently of or asynchronously relative to an online tax return preparation application while still interfacing with the online tax return preparation application to respond to an application's request for results generated by the data escrow system. Such results may be in the form of a personalized tax return topic ranking that is incorporated into an interview screen that is presented to a user of an online tax return preparation application during preparation of an electronic tax return.

Examples of tax return topics that may be processed by embodiments and integrated into a personalized tax return topic ranking include, but are not limited to, income, deductions, and taxes paid. Embodiments may also be utilized to rank sub-topics of a topic, e.g., certain types of income, such as wages or other income such as business income, interest, dividends, pension income, annuities, rental income, unemployment compensation, capital gains, gambling income, farming and fishing income, clergy earnings, social security, scholarships, alimony, canceled debt, 401k distributions. As another example, sub-topics for the topic of "deductions" may include medical and dental expenses, home mortgage points, interest expenses, charitable contributions, business related expenses (car, travel, etc.), educational expenses, property taxes. As used herein, "topic" is defined herein as including both such "topics" and "sub-topics" and further drilling down into additional sub-topic levels, and a tax return topic ranking may include only "root" node topics (e.g., income, deductions, etc.), a combination of "root" and "leaf" node topics/sub-topics (e.g., income, property tax, mortgage interest), only "leaf" node sub-topics of a certain topic (e.g., property taxes paid, points, mortgage interest), "leaf" node sub-topics of different topics (e.g., property taxes paid, points, mortgage interest, wages, dividends), or a combination of one or more topics, sub-topics and further drilled down or lower level, more specific sub-topics. "Topic" as defined herein includes such "topics" and "sub-topics" of various levels of specificity.

Embodiments also involve or are related to processing of a small portion of data managed by an online tax return preparation application in order to make changes to and improve interview screens and user experiences during preparation of electronic tax returns. Embodiments also involve or are related to reducing the amount of tax return data that is processed in order to implement dynamic changes to interview screens during preparation of an electronic tax return to provide personalized user experience, thus achieving improvements while providing for efficient use of computing resources as a result of, for example, reduced demands on processor and memory components and reduced data transmission between components and/or through networked components. For example, embodiments may involve transformation of on-line tax return preparation experiences as electronic tax return data is changed by a user of an online tax return preparation application. Thus, as a user's data changes, e.g., by adding, importing, deleting or changing data, embodiments are adaptive to these changes and provide for generation of interview screens that reflect these changes and include different tax return topic rankings or topic menus with topic items that are arranged in different ways depending on the data provided. Embodiments also involve or are related to transforming static menus or tax return topic listings into dynamic, adaptive menus or tax return topic listings that prioritize what a user is more likely to select or view, thus providing for more efficient menu presentation, electronic tax return preparation and computing resources to implement interview screens with more streamlined or reduced user interactions with interview screens and menu items generated by an online tax return preparation application.

As another example, an online tax preparation application may manage a "master" persistent data store that includes tax return data of millions of taxpayers, whereas embodiments utilize a separate data store or cache that includes a small portion of a persistent data store managed and serves as a low latency remote persistence mechanism where user data is stored and indexed for fast access and retrieval at decision computation time. Embodiments utilize a cache of data required by models that are used to compute decisions in the form of topic rankings, for example, for currently active users (i.e., user's with an active session or who are logged into the online tax return preparation application). While the a runtime persistence data store managed by the online tax return preparation application is used for maintaining all application data for all users over all time, the cache component utilized according to embodiments maintains only a small subset of that persistent data for active users, and only for the duration of the active user's session. Measured in volume of data managed, this means the scope data processed according to embodiments is much less than the data in the runtime persistence data store managed by the online tax return preparation application while, at the same time, use of the cache according to embodiments provides for more precise and tailored implementation decisions when choosing the hardware and software that that will be used to implement embodiment components.

Embodiments also involve models, such as predictive models, and integration of predictive models into on-line tax return preparation applications. Results generated by models are incorporated into user interfaces or interview screens generated by a tax return preparation application.

Embodiments also involve a modular escrow system that allows for changes to individual components such as models and specification files regarding data required for model execution, without having to modify code or components of an on-line tax return preparation application.

Embodiments also involve how a tax topic ranking system can execute independently of or asynchronously relative to an on-line tax return preparation application for which the topic ranking is generated.

Embodiments also involve user interfaces, such as user interfaces generated by online tax return preparation applications, and how such user interfaces can be modified during preparation of an electronic tax return, and in the background for an interview screen that is not currently viewed by a user.

According to one embodiment, a computerized tax return preparation system includes an on-line tax return preparation application and a tax return topic ranking system. The on-line tax return preparation application (such as turbotax.com) can be accessed by respective user computing devices executing respective browsers to prepare respective electronic tax returns of respective users. The on-line tax return preparation application is configured to write respective electronic tax return data of respective users to a first data store, or a master persistent data store. This first data store may include electronic tax return data of millions of customers for many years. The tax return topic ranking system is in communication with the on-line tax return preparation application and the first data store and can operate independently of the on-line tax return preparation application while interfacing with the online tax return preparation application to provide tax return topic rankings thereto. The tax return topic ranking system is configured to retrieve from the first data store particular types of data for respective users that are logged into the online tax return preparation application, and the small portions of data of respective logged-in users retrieved from the first data store are included in generated escrow records, which are stored or cached to a different, second data store. When data of an escrow record satisfies pre-determined criteria, a model is executed utilizing the particular types of electronic tax return data to generate a tax return topic ranking, which is provided to the on-line tax return preparation application. The on-line tax return preparation application is configured to generate an interview screen including tax return topics structured according to the generated tax return topic ranking.

According to another embodiment, a computerized tax return topic ranking system that is operable with an on-line tax return preparation application comprises an escrow controller, a model specification file, a selective data retrieval service, a second data store or cache for escrowed data, an execution service or model processor, and a third data store for storing results of model generation and that are to be provided to an online tax return preparation application. According to one embodiment, the escrow controller is in communication with the on-line tax return preparation application and can receive data from the online tax return preparation application indicating, for example, that a user has initiated an on-line session or logged into the online tax return preparation application. The escrow controller is configured to process the model specification file, or escrow contract, to determine which types of electronic tax return data are required in order to trigger execution of a model. One or multiple models may be applicable to a user and an escrow record may be generated for each active model for a user, and one or more escrow contracts may specify one or more types or combinations of data required for respective model inputs and execution. The selective data retrieval service is in communication with the escrow controller and the persistent or first data store utilized by the online tax return preparation application to maintain all application data for all users over all time. The second data store or cache is in communication with the escrow controller. The selective data retrieval service is configured to retrieve the logged in user's electronic tax return data of types identified by the model specification file (e.g., based on a subscription or request by the escrow controller) and provide the retrieved electronic tax return data to the escrow controller.

For example, the selective data retrieval service may be a polling service employed by the escrow controller, or a native element of the first data store that automatically notifies the escrow controller of changes in specified types of electronic tax return for logged-in users without the need for polling or a subscription for specific data or changes thereto. The escrow controller can generate an escrow record for the user or online session and including retrieved electronic tax return data, which may be some or all of the data types identified by the specification file. When the escrow controller determines that an escrow record contains the minimum required types of electronic tax return data identified by the model specification file, model execution is triggered, and for this purpose, the escrow controller is configured to issue a call to the model processor to execute a model identified in the model specification file. A result generated by execution of a model is a ranking of tax return topics, or a ranking of menu items (generally, ranking of tax return topics). This ranking result is provided to the online tax return preparation application. For this purpose, the escrow controller may be configured to store the model result in an independent third data store until the model result is requested by the online tax return preparation application.

The third data store may include the most recent or current model result generated and can be modified as a result of iterations of changes to the first data store data, changes to the second data store or cache data, changes to whether model requirements are satisfied and which models are executed with different inputs, and resulting different results.

A further system embodiment includes one or more or all components of a computerized tax return topic ranking system discussed above (including an escrow controller, a model specification file, a selective data retrieval service, a second data store or cache for escrowed data, an execution service or model processor, and a third data store) and the on-line tax return preparation application.

Further embodiments are directed to computer-implemented methods for generating ranked or prioritized data, e.g. in the form of a list or menu item, such as a list of tax return topics that is presented to a user of an online tax return preparation application.

Additional embodiments are directed to computer program products or articles of manufacture comprising a non-transitory computer readable medium embodying instructions executable by a computer to execute a process generating a ranking of tax return topics for presentation to a user of an online tax return preparation application.

Yet other embodiments are directed to adaptive or dynamic user interfaces or interview screens that reflect or can change given a current state of a user's tax return data.

Further embodiments are directed to how a small portion of data is retrieved from the first or persistent data store that maintains all data of all users of the online tax return preparation application and processed to generate portions of interview screens or user interfaces during preparation of an electronic tax return.

In a single or multiple embodiments, a third data store different from and independent of the first data store and the second data store is utilized to store a generated tax return topic ranking for subsequent retrieval in response to a ranking request by the on-line tax return preparation application. With system embodiments utilizing a distributed data store configuration in which each data store is separate and independent of the others, the on-line tax return preparation application can write data to and read data from the first data store, but the on-line tax return preparation application cannot write data to or read data from the second data store or the third data store.

In a single or multiple embodiments, a model that is utilized to generate a tax topic ranking may be or be based one or more predictive models including logistic regression; naive bayes; k-means classification; K-means clustering; other clustering techniques; k-nearest neighbor; neural networks; decision trees; random forests; boosted trees; k-nn classification; kd trees; generalized linear models and support vector machines. One or multiple models may be published or activated for use, and one or multiple models may be available for execution for an individual user session, and escrow records can be generated for respective models for each logged in user.

In a single or multiple embodiments, the tax return topic ranking system is initiated for a user in response to receiving data indicating that a user has logged into the online tax return preparation application or initiated an on-line session, and terminated when the user has logged off from the online tax return preparation application or terminated the on-line session.

In a single or multiple embodiments, the tax return topic ranking system, e.g., via an escrow controller, receives a request for a tax return topic ranking from the on-line tax return preparation application during preparation of the electronic tax return for a logged-in user. The type of response provided depends in part upon whether a model has been executed and a result for a logged-in user that is the subject of the request is stored in the third data store.

For example, a request received by an escrow controller may identify logged in user, and in response, the escrow controller may initially access the third data store to determine whether a tax return topic ranking has already been generated for the identified logged-in user. If so, this ranking can be provided in response to the request. If not, a determination can be made whether the escrow record data of the identified user in the second data store satisfies pre-determined criteria or escrow requirements. If these criteria or requirements are satisfied, a corresponding model can be executed to generate a tax return topic ranking, which is provided to the on-line tax return preparation application in response to the request. If the escrow data does not satisfy pre-determined criteria for a model, the tax return topic ranking system can wait for the escrow record to be modified such that the pre-determined criteria is satisfied, and the corresponding model can be executed and/or respond to the request by notifying the online tax return preparation application that no generated tax return topic ranking is available, in which case the online tax return preparation application may utilize a default or pre-determined topic ranking. As the escrow record is modified, as a result of adding, deleting or changing data to generate a different escrow record, such modifications may result in execution of different models, which may result in different topic rankings.

In a single or multiple embodiments, data analyzed relative to requirements of an escrow contract or specification file is read from a single source, i.e., the second data store or cache of the portion of the data in the first data store. In another embodiment, electronic tax return data is provided by multiple sources, and in one embodiment, this involves both the second data store or cache and the on-line tax return preparation application, e.g., the request provided by the online tax return preparation application.

In a single or multiple embodiments, as escrow record data is modified, this may result in execution of the same model again with different data of the same type for that model, which may or may not result in a different tax return topic ranking. According to another embodiment, changes to an escrow record may trigger execution of a different model, which may result in a different tax return topic ranking.

In a single or multiple embodiments, a tax return topic ranking system being configured to execute the model independently, asynchronously, or in an uncoordinated fashion relative to the on-line tax return preparation application writing electronic tax return data to the first data store. Thus, after a tax return topic ranking system is initiated for a particular user in response to receiving a "start" signal from the online tax return preparation application indicating that a new online session has been initiated, the online tax return preparation application and the tax return topic ranking system are independent of each other and do not coordinate with each other until a request is made for a tax topic ranking at which point these components are not coordinated or in synchronization with each other.

DETAILED DESCRIPTION OF ILLUSTRATED EMBODIMENTS

Figure 1:
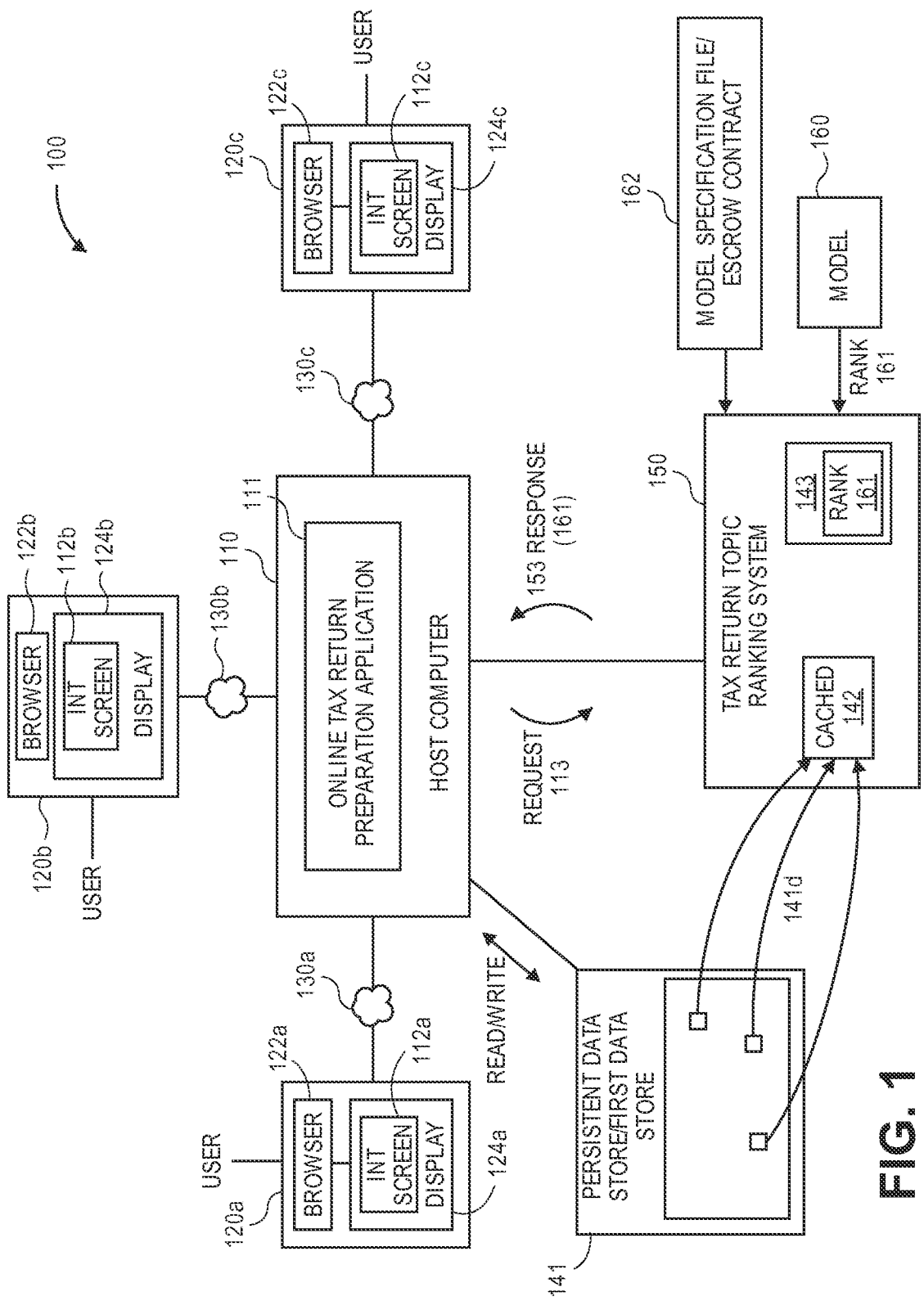
FIG. 1 is a block diagram of a computerized tax return preparation system constructed according to one embodiment including a ranking system that executes a model to determine a ranking of tax return topics for presentation in an interview screen generated by an online tax return preparation application.

Embodiments of the invention relate to how a personalized list of topics or menu options is generated, communicated to a tax return preparation application (such as turbotax.com), and presented to a user, and how topics or menu items rankings can change as a user prepares an electronic tax return. Embodiments of the invention may be utilized with or be integrated into computing systems or applications such as on-line tax return preparation applications to provide taxpayer users with a list of tax topics or menu options that are arranged in a particular ranking, sequence or order and to change the order of menu options or list of tax topics as a taxpayer user enters or changes data during preparation of an electronic tax return. Thus, as an electronic tax return is prepared, the order or sequence of tax topics presented to taxpayer users is also changed to reflect changes or updates to the tax return data. Embodiments of the invention may also be utilized in other on-line or networked system such as television systems to or on-line movie systems (such as netflix.com) to provide viewers with a list of viewing options that are arranged in a particular ranking sequence or order. For example, as a user views various television programs or movies, an order or sequence of other available television programs or movies or types thereof (e.g., comedy, horror, romance, etc.) may be changed as the user browses or views various programs or movies.

For on-line tax return preparation applications, as an example, real time topic ranking changes are implemented using a computing system that that utilizes a only small portion of data in a "master" data store managed by the on-line tax return preparation application, while monitoring the master data store for changes to data for user that are currently logged into the on-line tax return preparation system. This small portion of data is escrowed or cached, or temporarily stored, to another, independent data store that the online tax return preparation application does not and cannot access. As data is escrowed, cached or temporarily stored, the system determines whether there is a model that can be triggered to determine a tax return topic ranking for one or more interview screens, and when these model requirements are satisfied, and the models are executed, the resulting rankings that are generated are provided to the on-line tax return preparation application.

Thus, when a user navigates to other interview screens, tax topics that can be selected within the interview screens, whether presented in a menu or other form, are arranged according to the determined ranking rather than according to a static, default or fixed sequence. As a simplified example, based on the data retrieved from the "master" data store, execution of a model may change the order of "income" topics in an interview screen that may be set to be displayed next from a default or static order that begins with "wages" (e.g., for Form W-2) to a new order of: dividends, capital gains, business income, interest, rental income, etc., thus not only resulting in modification of the user interface presented to the user, but also providing the user with a more personalized and pertinent tax return preparation experience.

As the user continues to prepare the electronic tax return, the user's data changes may result in re-execution of the same model or execution of other models which, in turn, may result in changes to how tax topics are presented in various interview screens.

Thus, embodiments not only transform tax topic sequences during preparation of an electronic tax return, but also transform a pre-determined, static user experience into a dynamic, personalized experience, and do so utilizing only small portions of the "master" data which, leads to reduced demands on computing resources compared to other systems and methods that require additional data and interactions. Further aspects of embodiments are described with reference to FIGS. 1-10B.

Referring to FIG. 1, in a computer system 100 constructed according to one embodiment, an online tax return preparation application 111 is managed by a host computer 110. The online tax return preparation application 111 is accessed by respective user computing devices 120a-c (generally, computing device) executing respective internet browsers 122a-c (generally, browser) through respective networks 130a-c (generally, network 130) utilizing the online tax return preparation application's Uniform Resource Locator (URL) address. Interview screens 112a-c (generally, interview screen) generated by the online tax return preparation application 110 are presented to respective users through screens or displays 124 of the computing devices 120. Users interact with the displayed interview screens 112 by entering or importing tax return related data into respective fields thereof to prepare respective electronic tax returns.

Examples of browsers 122 that may be utilized for this purpose include INTERNET EXPLORER, GOOGLE CRHOME and MOZILLA FIREFOX browsers, and examples of networks 130 that may be utilized for communications between computers include. A user computing device 120 maybe a desktop computer, a laptop computer, a mobile communication device such as a smartphone or a tablet computing device. Examples of networks 130 that may be utilized for communications between system components include but are not limited to a Local Area Network (LAN), a Wide Area Network (WAN), Metropolitan Area Network (MAN), a wireless network, other suitable networks capable of transmitting data, and a combination of such networks. For ease of explanation, reference is made to a network 130 generally, but various networks, combinations of networks and communication systems, methods and protocols may be utilized.

In the illustrated embodiment, the online tax return preparation application 111 manages a "master" or "global" persistent data store 141 (otherwise referred to as a "first" data store 141) for respective electronic tax return data or electronic tax returns of respective users of the online tax return preparation application 111. The first or master data store 141 may include data for millions of electronic tax returns for many users for many years. Thus, it is important for this first data store 141 to be a secure and robust and a persistent storage of many taxpayer files. The first data store 141 may be hosted by the same computer 110 or may be accessible by the on-line tax return application 111 through a communications network 130 (not illustrated). During use, when a user logs into the online tax return preparation application 111 or initiates an on-line session to begin or continue preparation of an electronic tax return, the online tax return preparation application 111 writes electronic tax return data to the first data store 141 to reflect the data entered, changed or imported (e.g., from a computerized financial management system such as mint.com), reads electronic tax data from the first data store 141 and generates interview screens 112 and tax forms populated with the data.

In the illustrated embodiment, a tax return topic ranking system 150 (generally, ranking system) is in communication with the on-line tax return preparation application 111 and is shown in FIG. 1 as being in communication with the on-line tax return preparation application 111 and the first data store 141 managed thereby. In the illustrated embodiment, the ranking system 150 is in communication with the on-line tax return preparation application 111 and the first data store 141, e.g., through respective communication networks 130 (not illustrated) or other communication channels, and may also be a component or module of, or a plug-in into, the online tax return preparation application 111 depending on the system 100 configuration employed. For ease of explanation, the ranking system 150 is shown as being an independent component in communication with the online tax return preparation application 111 and first data store 141 managed by the online tax return preparation application 111.

The ranking system 150 can access the first data store 141 to read only certain types of data 141d ("d" referring to "data"), but is not able to write any data to the first data store 141 given integrity requirements of storing electronic tax return data as noted above. When a user has initiated an on-line session or logged into the online tax return preparation application 111, the algorithm performed by the ranking system 150 includes retrieving a small portion of the first data store data 141d for that particular user, i.e., for a specific on-line session, and caches, escrows or temporarily stores the retrieved data 141d locally until the raking system 150 determines that conditions or requirements 162 reflected in a specification file or escrow contract concerning an executable model 160 are satisfied such that the model 160 can be executed. The conditions or requirements 162 dictate when a model 160 is allowed to execute.

The model 160 may be a customized model or a model such as a predictive model, examples of which include logistic regression; naive bayes; k-means classification; K-means clustering; other clustering techniques; k-nearest neighbor; neural networks; decision trees; random forests; boosted trees; k-nn classification; kd trees; generalized linear models and support vector machines. For ease of explanation, reference is made to "model."

If model requirements 162 are not satisfied given a current set of data retrieved 141d from the first data store 141 and cached or locally stored by the ranking system 150 in a second data store or cache 142 (second data store), the data 141d remains cached or escrowed for future use for subsequent iterations of checking for a different model 160 that can be executed or when the first data store 141 is updated or changed and those updates or changes are retrieved and cached locally by the ranking system 150. Then, a model 160 may be able to execute with the retrieved data updates 141d.

Thus, if the on-line tax return preparation application 111 issues a request 113 to the ranking system 150 for a tax return related topic ranking 161, e.g., for an interview screen 112 determined to be displayed to a user next given the interview screen 112 that is currently being displayed, the response 153 to the request 113 indicates that there is no result, and the on-line tax return preparation application 111 may utilize the prior or default ranking. In certain embodiments, the data utilized for model 160 execution is only data 141d that was previously retrieved from the first data store 141 and cached locally by the ranking system 150 in the second data store 142. In another embodiment, data utilized for model 160 execution may come from multiple sources such as cached or locally stored data 141d that was previously retrieved from the first data store 141 and data of or derived from the request 113 by the on-line tax return application 111.

For example, there may be instances in which a model 160 requires ten types of data and nine of the ten types of data 141d have been retrieved from the first data store 141 and are stored in the second data store 142. Thus, while all of the required data 141d has been retrieved from the first data store 141, the model 160 still cannot execute until the final data is received or derived from the request 113 by the on-line tax return preparation application 111 after which the model 160 can be executed.

If data requirements for model 160 execution are satisfied based on the current set of data retrieved 141d from the first data store 141 and cached 142 by the ranking system 150, or based on a combination of data of the second data store 142 and another source such as the request 113, the model 160 is executed to generate a result 161 in the form of a ranking or sequence of tax topics 161. When the online tax return preparation application 111 issues a request 131 for a tax topic ranking, e.g., based on one or more screens 112 that are determined to be displayed next or later in a sequence of interview screens 112 given the interview screen 112 that is currently being displayed, the generated ranking 161 can be communicated to the online tax return preparation application 111 in response to the request 113.

Examples of tax return topics that may be processed by embodiments include, but are not limited to, income, deductions, taxes paid. Embodiments may also be utilized to rank sub-topics of a topic, e.g., certain types of income, such as wages or other income such as business income, interest, dividends, pension income, annuities, rental income, unemployment compensation, capital gains, gambling income, farming and fishing income, clergy earnings, social security, scholarships, alimony, canceled debt, 401k distributions. As another example, sub-topics for the topic of "deductions" may include medical and dental expenses, home mortgage points, interest expenses, charitable contributions, business related expenses (car, travel, etc.), educational expenses, property taxes. As used herein, "topic" is defined herein as including both such "topics" and "sub-topics" and further drilling down into additional sub-topic levels, and a tax return topic ranking may include only "root" node topics (e.g., income, deductions, etc.), a combination of "root" and "leaf" node topics/sub-topics (e.g., income, property tax, mortgage interest), only "leaf" node sub-topics of a certain topic (e.g., property taxes paid, points, mortgage interest), "leaf" node sub-topics of different topics (e.g., property taxes paid, points, mortgage interest, wages, dividends), or a combination of one or more of topics, sub-topics and further drilled down or lower level, more specific sub-topics. "Topic" as defined herein includes such "topics" and "sub-topics" of various levels of specificity, and a resulting ranking 161 may include "topics" of one more levels of specificity or root and/or leaf node level topics or sub-topics. A ranking 161 may include a small number of topics (e.g., three or four), or a larger number of topics (e.g., 10-20), the order of which such topics are displayed to a user being reconfigurable in real-time during preparation of an electronic tax return with embodiments of the invention and is reflective of the user's electronic tax return data managed by the online tax return preparation application 111.

Thus, with embodiments, when a user navigates to that associated interview screen 112, the tax return topics in that interview screen 112 that would normally be presented in an interface including a first sequence, order or ranking (e.g., Rank 1) which may be a static or fixed sequence) are transformed into another interface including a different, second sequence, order or ranking (e.g., Rank 2) such that the second ranking 161 generated by model execution 160 is personalized or customized for the user, while utilizing a very small portion of first data store data 141d.

The ranking 161 that is generated and communicated to the on-line tax return preparation application 111 in response to the request 113 may be one that was previously generated and locally stored or cached, waiting to be delivered to the online tax return application 161 in response to a request 113. In another embodiment, if a requested 113 ranking has not been generated, the ranking system 150 may then execute a model 160 (assuming the requisite data for the model 160 has been collected and is stored in the second data store 142 per the specification file 162), and the resulting tax topic ranking 162 generated by execution of the model 160 is provided to the online tax return preparation application 161 in response to the request 113 and may be locally stored in a third data store 143 for future reference.

Figure 2:
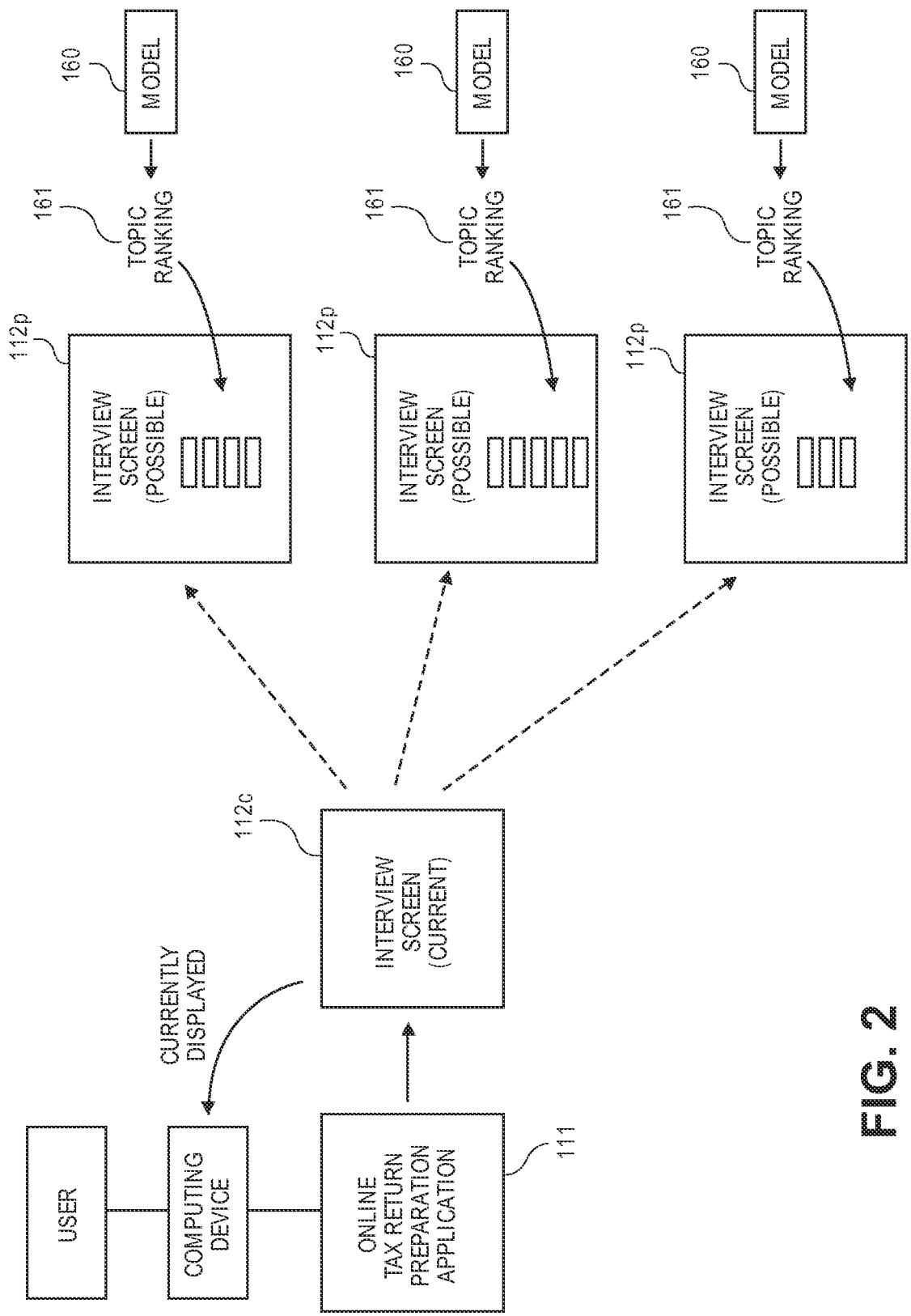
FIG. 2 depicts how system embodiments may be utilized to change how tax return topics are presented in interview screens that are may be presented to a user at a later time relative to or based at least in part upon a currently displayed interview screen or other electronic tax return data in order to provide a more personalized listing of tax return topics for the user.

Referring to FIG. 2, the user may be interacting with a currently displayed interview screen 112c ("c" referring to "currently" displayed), and based on a pre-determined, predicted or potential sequence of interview screens 112p (that are not currently displayed) given the currently displayed interview screen 112c, the online tax return preparation application 111 may request rankings 161 for these other interview screens 112p that are not currently displayed 112c but that will be, or might be, displayed. As shown in FIG. 2, rankings 161 may be generated for various numbers of "future" or "potential" interview screens 112p (Screen1-Screen3 112p that are not currently displayed are illustrated) and various numbers of rankings 161 (Rank1-Rank3 are illustrated) generated by respective models 160 that apply to the interview screens 112.

While embodiments are described with reference to how rankings 161 may be generated for future potential interview screens 112p that are not currently displayed, embodiments may also be executed concurrently for multiple users, thus providing a personalized tax return preparation experience for each user. Thus, with reference again to FIG. 1, the online tax return preparation application 111 may issue Requests 1-3 for respective users U1-U3, and each request may involve one or multiple topic rankings for interview screens that will or may be displayed to the user after a currently displayed interview screen. The online tax return preparation application 111 may also issue Requests 1-3 for respective interview screens for a particular user. Examples of specific embodiments are described in further detail with reference to FIGS. 3-10B.

Figure 3:
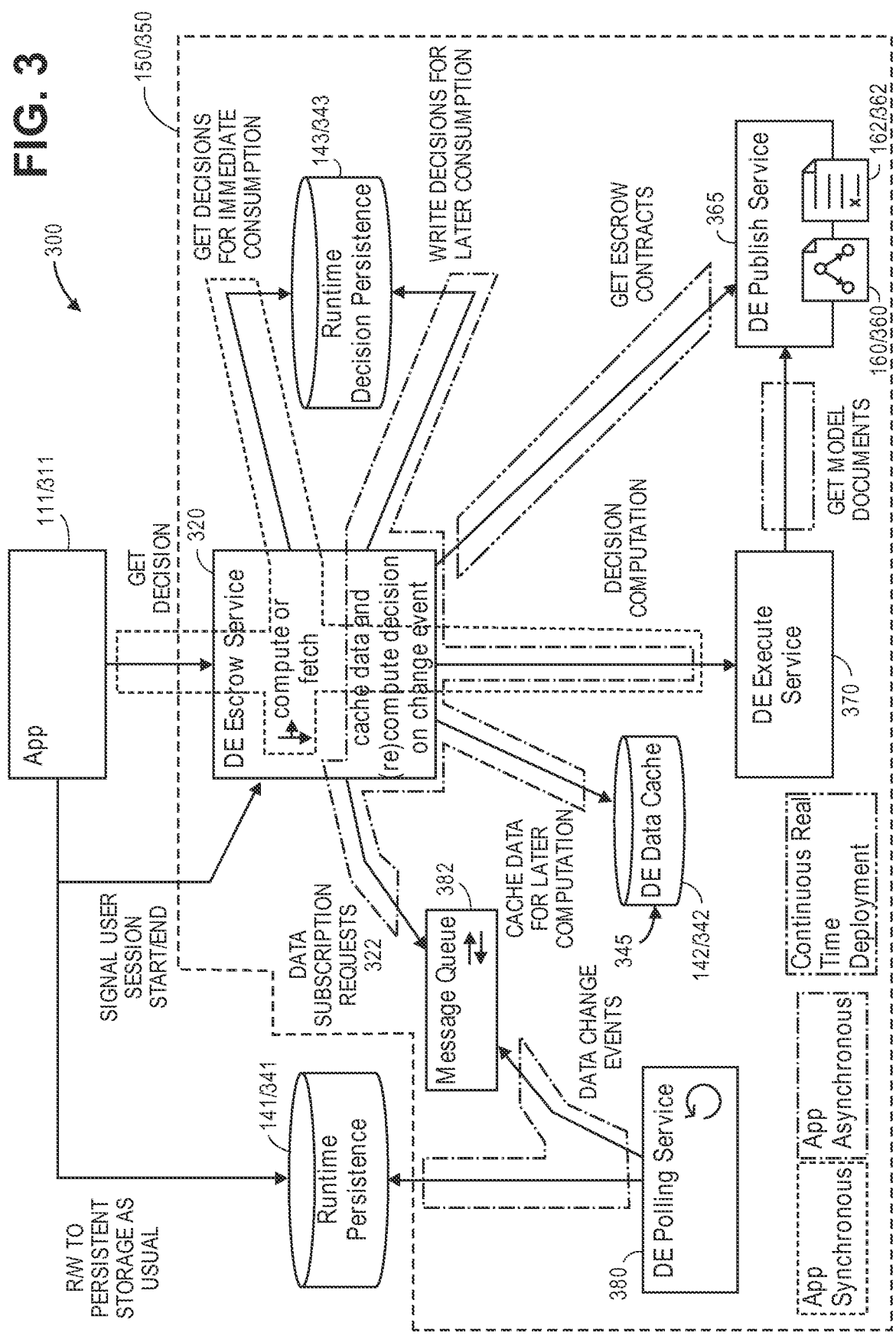
FIG. 3 is a system flow diagram showing components of computerized tax return preparation systems constructed according to embodiments and aspects of computer-implemented methods for providing an escrow-based personalization system that can be utilized to provide tax return topic rankings to an online tax return preparation application to personalize tax return preparation experiences.

Referring to FIG. 3, a computerized tax return topic ranking system 150/350 (generally, ranking system 350) constructed according to one embodiment interfaces with a tax return preparation application 111/311 and comprises an escrow controller 320, an escrow or model specification file 162/362, a selective data retrieval service 380, a model processor or model executor 370, a second data store 142/342 to which selected data for a logged-in user is retrieved from a first or "master" data store 141/341 is written and temporarily retained as an escrow record 345. For each on-line session, an escrow record 345 is generated for each user and for each model 160/360 applicable to each user. Models 360 and escrow contracts or model specification files 362 are activated or made available for use via a publication service 365.

Certain embodiments also include a third data store 143/343 that may be dedicated to storing a current tax return model ranking 161/361. System components are described in further detail together with how they work together with other system components to implement computer-implemented methods for determining and communicating tax return topic rankings 361 that are communicated to an on-line tax return preparation application 311.

The escrow controller 320, also referred to as an Decision Engine (DE) Escrow Service in FIG. 3, is a central, intermediate control element that interfaces with the on-line tax return preparation application 311 and manages escrow of retrieved data, model 360 execution, when a model 360 can be executed based on an escrow contract or specification file 363, and how a tax return topic ranking 361 is retrieved and communicated to the on-line tax return preparation application 311. The escrow controller 320 manages escrow records 345 generated for data retrieved from the first or master data store 341 and cached or temporarily stored to the second data store 342 and manages escrow records 345 in the second data store 343. There is one escrow record 345 per active user session, per active model 360. Thus, as data is collected from the master of first data store 341, it is temporarily held or stored in the second data store 342 and accumulated to satisfy certain model execution requirements 362. In this way, the data retrieved from the first data store 141 is held "in escrow" until such time as it can be used to execute a model 160 to generate a result 161 in the form of a tax return topic ranking.

The escrow record 345 that is generated by the escrow controller 320 and stored to the second data store 342 includes a user identifier such as a ticket or token generated for the on-line session when the user logged into the on-line tax return preparation application 311, a model identifier, which identifies the model 360 to which the escrow record 345 pertains (since an escrow record 345 is generated for each user and each model 360 applicable to each user), a description, such as a canonical description or unique identifier of required data and its location in the second data store 342 for the associated model 360, and which will be used to build a payload that is provided to a model execution service or model processor 370 by the escrow controller 320, and a description, such as a canonical description, of the location to which the generated result or model output 361 (in the form of a ranking of tax topics), is to be written, e.g., in a third data store 343 dedicated to storage of model results 361.

An escrow record 345 is never the source of truth for a particular value for a particular customer; instead, the source of truth will always be the location from where the data was initially retrieved. The set of user data managed by the escrow controller 320 is a much smaller subset of the user data managed by the collection of "source of truth" data stores, i.e., the first or "master" data store 341 in the illustrated embodiment. Whereas a "master" or first data store 341 is charged with managing all data for all users of the online tax return preparation application 311 for all time, embodiments operate based only on a sliver or very small set of that data—only for users that are currently logged into the online tax return preparation application 311, and only for types of data required by models 360 that have been activated or published via a publication service 365. Given the very small of data of the first data store 141 that is utilized, embodiments provide for a system that utilizes data stores 342 that may be a smaller, upper bounded, low latency memory based cache rather than the first data store 141, which is a very large, growing and permanently persistent storage mechanism.

A computer-executable model 360 is executable by the model processor or execute service 370 utilizing cached data of escrow records 345 for that model 360 to generate a result 361 in the form of a ranking of tax return topics. A model 360 includes data such as a unique model identifier, a description, e.g., canonical description expressed in XML Schema Definition (XSD), of the format of data inputs for the model 360, and a specification file or escrow contract 362 specifies the types and locations of data needed to execute a model 360. For example, a specification file 362 may list the canonical location of a piece of data, e.g., lists the zip code not just as word "zip" but as instruction that the escrow controller 320 can read and interpret to determine how to fetch the "zip" data from the second data store 342 and indicates when a call can be made by the escrow controller 320 to the model processor 370 to execute the model 360.

The escrow contract 362 also indicates whether certain inputs are required or optional. For example, a model 360 may require 10 total inputs to execute, and may only execute on those specified 10 inputs, or a model may require 10 total inputs to execute, but if an escrow record 345 includes other types of data, these other types of data may also serve as inputs to a model 360 to supplement the other required data. As shown in FIG. 3, the specification file 362 is provided to the escrow controller 320, but not the model processor 370, and the model 360 is provided to the model processor 370 but not the escrow controller 320. Thus, system embodiments involve a distributed model execution system in which execution of the model 360 is separate of determinations of whether the model 360 should even be executed, and if so, how the model 360 should be executed (i.e., how to locate the data for the model 360 in the second data store 342). Thus, the model processor or execution service 370 is a computer processor component that, once called by the escrow controller 320 to execute a model 360 upon satisfying the requirements specified by the specification file 362, provides an execution result 361 in the form of a ranking of tax return topics to the escrow controller 320 based on the cached data provided to it.

Embodiments also utilize a selective data retrieval service 380 that is also controlled by the escrow controller 320 for the purpose of retrieving pre-determined types of data for a currently logged in user from the first or master data store 341 and to check for changes in certain types of data in the shared data store 341. The data retrieved from the first data store 341 is utilized by the escrow controller 320 to generate an escrow record 345 or to update an escrow record 345 given a data change, and to monitor or check the first data store 341 for changes in pre-determined types of data for a particular user so that corresponding escrow records 345 can be updated in the second data store 342. While the second data store 342 is utilized by the escrow controller 320, the second data store 342 is not accessible by the online tax return preparation application 311. This is further illustrated in dashed line in FIG. 3 that surrounds ranking system 350 components other than the online tax return preparation application 311 and the first data store 341 managed thereby.

Examples of suitable caching applications that may be utilized in embodiments include, memcached and redis, which provides for the second data store 342 to serve in the role of a low latency remote persistence mechanism to which user data (which is a small fraction of the amount of data stored by the first data store 341) is stored and indexed for fast access and retrieval at decision computation time. The second data store or cache 342, as its name implies, is a cache of all the data required by all models 160 will be used to compute rankings or decisions 361 for all the currently active users (i.e., users with an active on-line session, but not users that are not currently logged in). In other words, the limited scope and role of the second data store 342 can be described through its contrast with the first data store 341, which is a runtime persistent storage component responsible for maintaining all online tax return preparation application 311 data for all users over all time. This is in sharp contrast to the second data store 342, which needs only to maintain a small subset of that data for active users and only for the duration of the active user's session. Measured in volume of data managed, this means the scope data and responsibilities of the second data store 342 is much less than those of the first data store 341. As such, embodiments allow for more precise and tailored implementation decisions when choosing hardware and software that that will be used to implement the second data store 342 cache component.

One type of data retrieval service 380 that may be utilized to retrieve data from the first data store 341 and cache it to the second data store 142 is a polling service that manages one or more pollers that are active for a user's on-line session to retrieve the user's data from the first data store 341 and to detect when pre-determined data fields in the first data store 341 have been changed, e.g., added, deleted or modified. A poller is an object that works on behalf of a single active user model 360 to gather data from the first data store 341. A poller may include or utilize data such as a user identifier (such as an authid or user name and a ticket or token or password) for the on-line session, a collection of fields in the first data store 341 to poll or monitor, and a time during which the poller is active or how long the poller should continue to monitor the specified fields of the first data store 341. A poller can be configured to monitor or check the first data store 341 at certain times or periodically with a scheduler. Pollers are configurable such that frequency of polling can be modified to increase or decrease the frequency of fetching data or to run off or terminate the poller after a pre-determined time.

Embodiments may utilize different types of polling services or polling mechanisms. In one embodiment, the escrow controller 320 submits a subscription 322 to changes in a specified data field of the first data store 341 such that all modifications to this data field by the on-line tax return preparation application 311 will result in a change event being fired and received by escrow controller 320. This "subscribe" configuration involves an ongoing, continuous subscription 322. In addition to an ongoing subscription 322 to get access to all subsequent changes to a data field of the first data store 141, the data field will also be fetched once at the time of the creation and initialization for purposes of generating an escrow record 145.

This will allow the system to "catch up" to the last known state of the data field, and then stay caught up while the subscription 322 is active. This procedure can be used for any data field that is likely to change during the course of a user's session.

According to another embodiment, the polling service 380 utilizes a subscription 322 as described above, but rather than "subscribe" generally, the subscription is limited to "subscribe until found." Thus, in this embodiment, the subscription 322 is active during monitoring of a specified data change in the first data store 141, but when that data change in the form of a change from an empty field to a populated field of the first data store has been detected and the data has been cached to the second data store 142, the subscription 322 can be terminated. A "one time" subscription may also be employed to detect a change in a populated field to different data, after which the subscription 322 is terminated. According to yet another embodiment, the polling system 280 may be configured as a "fetch once" system such that a data field will be preemptively retrieved from the system and provided to the escrow controller 320. This configuration may be suitable for data items of the first data store 141 that are highly unlikely to change during the duration of the escrow controller's 320 operation and on-line session. For instance, any data representing an unchanging fact (i.e., "did an event occur at some point in the distant past?"), would likely be appropriate to retrieve with this strategy. This strategy also involves less computing resources than strategies involving a subscription.

While it will be understood that various polling systems 380 may be utilized, for ease of explanation, reference is made to a polling system 380 generally, and one that utilizes a subscription 322 to changes of data in the first data store 141 as shown in FIG. 3.

Thus, embodiments that utilize a data retrieval service 380 in the form of a poling service (as illustrated in FIG. 3), which may take various forms as noted above, can be utilized in the event that the first data store 341 does not support native automated data feeds from the first data store 341 and that indicate to the escrow controller 320 which fields have been changed or updated. For example, rather than using a polling mechanism, the first data store 341 may be configured to automatically output a data feed in the form of a stream of information identifying changes to data to which the escrow controller 320 has subscribed.

In embodiments that utilize a data retrieval service 380 in the form of a polling service, there is one poller for every active escrow record 345, which in turn will exist for every active user and for every active model 360. The escrow controller 320 manages the lifecycle of a poller, which may be in the form of independent threads of execution across a large cluster of machines. This independence and statelessness of pollers allows for horizontal scaling of the machines, and the escrow controller 320 ensures that there is a single poller per unique active model for an on-line session.

The system flow diagram shown in FIG. 3 illustrates one example of a selective data retrieval service 380 in the form of a poller service and poller management and how the escrow controller 320 interacts with a polling service 380 One embodiment of a poller-based data retrieval service 380 includes a polling manager or service, which includes a collection of poller objects which, as noted above, work on behalf of a single active user model to gather data from the first data store 341, a collection of buckets, which are sets of poller objects executed for each run of a poller executor, which is activated (e.g., periodically, such as every second) to select a bucket of poller objects from the poller manager for execution in an asynchronous manner, and a timing mechanism to implement poller expiration such that a poller is not active beyond a certain time.

Figure 4:
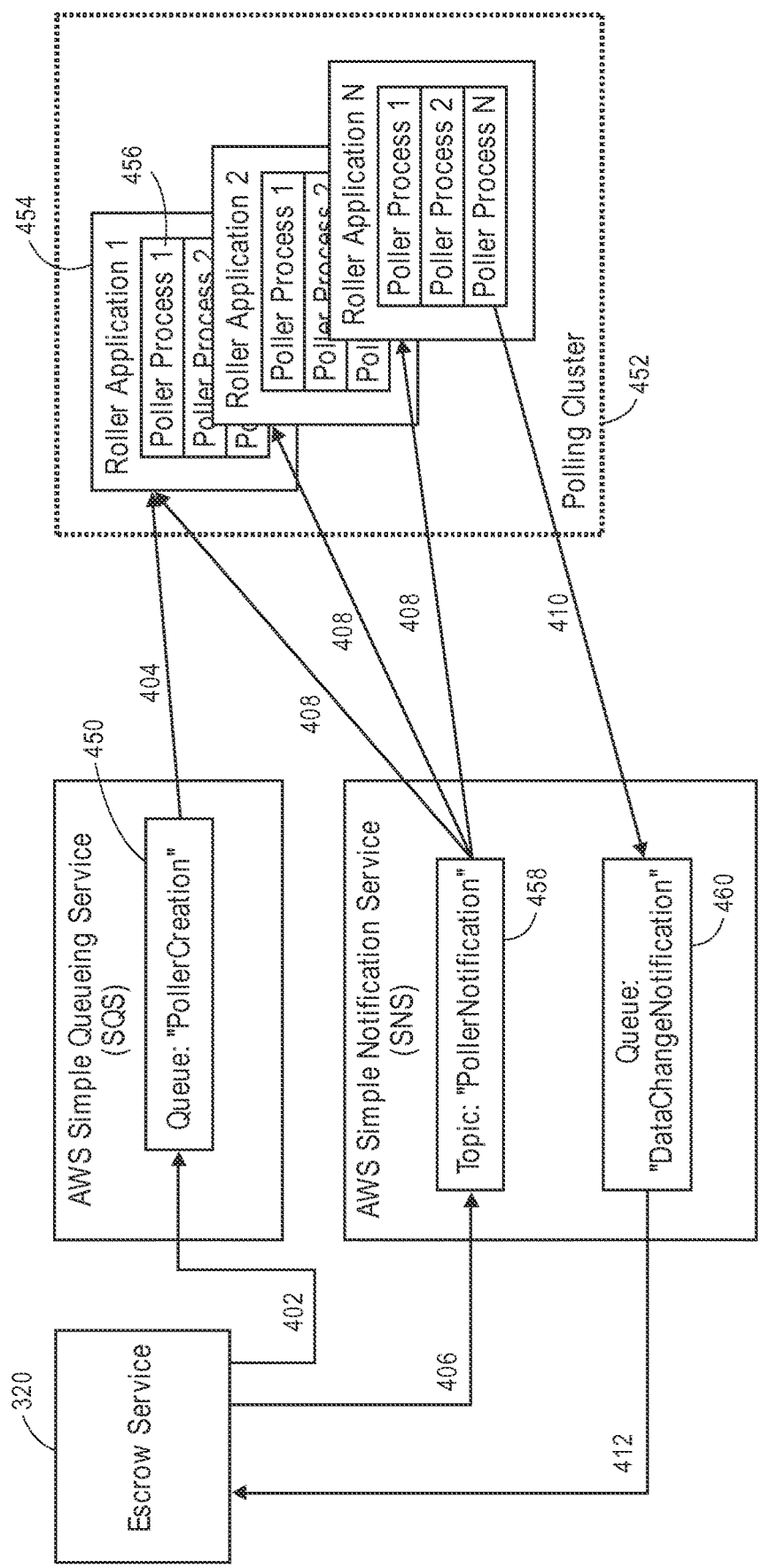
FIG. 4 is a system flow diagram illustrating one manner in which a polling service may be implemented and operate according to embodiments.

FIG. 4 is a system flow diagram reflecting system components and an algorithm for of one manner in which a polling system 380 is executed and how the polling system 380 interacts with the escrow controller 320 ("Escrow Service" in FIG. 4). At 402, the escrow controller 320 sends a "create poller" request to a PollerCreation message queue 450, and at 404, this message is passed to a single poller application in the cluster 452, and the poller application 454 instantiates one poller process 456 and executes it according to instructions in the escrow controller's 320 request. At 406, at some later time, the escrow controller 320 wants to modify the behavior of a single existing poller process 456 or multiple poller processes 456 and for this purpose, sends a message to the "PollerNotification" topic 458. The message identifies the poller process 456 to modify together with instructions describing the nature of the modification. At 408, the modification message is broadcast to all poller applications 454 (represented by three arrows), and the poller application 454 that is managing the poller process 456 with the message's identifier reacts to the message by modifying the poller process 456 as appropriate. Other poller applications 454 can ignore the message. At some later time, the escrow controller 320 wants to remove the poller process 456 from service, and for this purpose, submits a message to the same "PollerNotification" topic 458. The message identifies the poller process 456 to remove, and this removal message is broadcast to all of the other poller applications 454. The poller application 454 managing the poller process 456 with the removal message's identifier responds to the removal message by removing the poller process 456 as appropriate, and other poller applications 454 can ignore the removal message.

At 410, at some later time, and following an update or change to data of an on-line session for which the poller has been activated, a poller process 456 instance detects the data change in the first data store 341 and sends a message containing the details of the detected data change to the "DataChangeNotification" queue 460, and at 412, the escrow controller 320 receives the message from the queue 460 and updates an escrow record 345 in the second data store 342 accordingly.

Referring again to FIG. 3, the system embodiment that is illustrated also utilizes a distributed and shared data store configuration (341, 342, 343) such that each data store has its own purpose and can function independently of the other. With this system structure, the on-line tax return preparation application 311 can only access, and write to and read from, the first or master data store 341, but cannot access the second data store 342 or the third data store 343. Instead, the second data store 342 and the third data store 343 are only accessible by the escrow controller 320.

With this system configuration, the first or master data store 341, or the runtime persistence data store, is the data store that includes electronic tax return data for numerous, if not all, users of the on-lien tax return preparation application 311, for the current year as well as for prior years, and manages data that collectively forms a profile of a user such as user, product purchase history, tax information and electronic tax returns, and interaction events (e.g., pages visited). The first or master data store 341 is thus a very large, secure and robust data store given the amount and sensitive nature of the data stored in the first data store 341.

The second data store 342, in contrast to the first or master data store 341, retrieves only a very small fraction of the data of the first data store 341 and caches or temporarily stores the retrieved data for a specific an on-line session—it is not necessary to store data retrieved from the first data store 341 when the user is off-line since the second data store 342 is configured as a temporary data store or cache to which selected data is escrowed until it can be utilized for model 360 execution for a particular on-line session.

The third data store 343 is utilized for storing the results 361 of model 360 execution in the form of tax return topic rankings and for each result or tax return ranking generated, may include data such as an authid that identifies the user to which the tax return topic ranking 361 applies, an entity key that is globally unique among all generated decisions or tax return topic rankings 361, a flag that is used to indicate whether or not tax return ranking 361 has been provided to or consumed by the online tax return preparation application 311, and a decision or result document containing the content in the form of the tax return ranking 361 for the identified user and executed model 360.

Having described various components of system embodiments and their functionality, computer-implemented methods and further system configurations are described, and how embodiments may operate in "automatic" mode and "semi-automatic" mode, with reference to FIGS. 5-10B.

Figure 5:
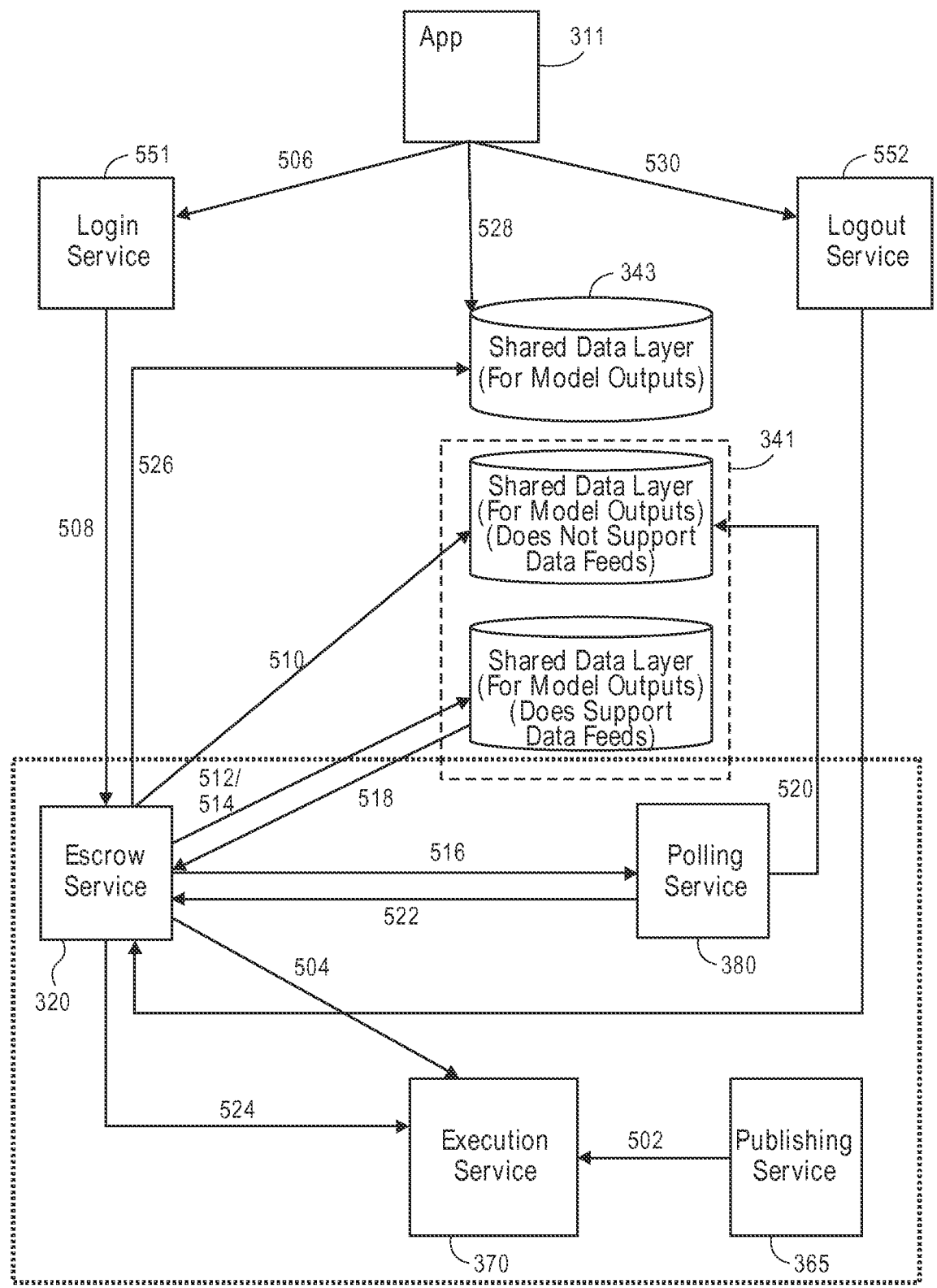
FIG. 5 is a system flow diagram illustrating how components shown in FIG. 3 can operate in a mode in which model execution to generate a tax return topic ranking is based on retrieval of selected data from a persistent data store managed by an online tax return preparation application.

Referring to FIG. 5, and with continuing reference to FIG. 3, in one embodiment, the escrow controller's 320 coordination of the execution of a model 360 is a "fully automatic" algorithm in the sense that the online tax return preparation application 311 that is consuming a generated tax return ranking 361 plays no role in the coordination of the timing of the production of the tax return topic ranking 361. Instead, the online tax return preparation application 311 operates as it normally does by incrementally adding, updating, deleting data in the first or master data store 341, and the changes to data of a logged-in user in the first data store 341 serve as the triggers for the escrow controller 320 to analyze the second data store 342 data relative to the activated models 360 and specification files 362 indicating when such models 360 can be executed. In this manner, generation and management of escrow records 345 by the escrow controller 320 and eventual model 360 execution is a result of or side effect of a trigger in the form of changed data in the first data store 341.

With continuing reference to the system flow diagram of FIG. 5 and the description of an embodiment that operates in "automatic" mode, at 502, models 360 and specification files or escrow contracts 362 are loaded or published to the system via a publishing service 365, and the model 360 is available for execution by the model processor or execution service 370, and the escrow controller 320 receives a specification file 362 that specifies the conditions that must be satisfied before a call can be made to the model processor 370 to execute the model 360. This is shown by "get model documents" and "get escrow contracts" in FIG. 3—the model processor or execute service 370 can access published models 360 but not a specification file or escrow contract 362, which is only accessible by the escrow controller 320. Thus, model 360 execution and how and when the model 360 is executed are separated from each other and independent of each other.

At 504, the escrow controller 320 calls the model processor 370, e.g., periodically, and the model processor 370 returns data about or identifying the models 360 that have been published and are activated or live and available for execution.

At 506, a user logs into the online tax return preparation application 311 with user credentials (such as user name and password), and a login service 550 of the online tax return preparation application 311 verifies the credentials. Assuming the credentials are correct, the login service 550 initiates an on-line user session for that user, and at 508, data indicating initiation of an on-line session is communicated from the login service 550 to the escrow controller 320. This is also illustrated in FIG. 3 as the arrow from the online tax return preparation application 311 to escrow controller 320 indicating "signal user session start/stop" (the beginning of an on-line session concerns the "start" portion of "start/stop").

At 510, knowing the model 360 data and the "when and how the model is executed" set forth in the specification files 362 that have been received, the escrow controller 320 utilizes a message queue 382 to communicate with the first data store 341, and at 512, pulls or retrieves available types of data of the model 360 from the first data store 341 to generate, complete or supplement an escrow record 345, which is stored in or written to the second data store 342. For these purposes, the escrow controller 320 retrieves data from the first data store 341 utilizing a polling service 380, a native automatic data feed of the first data store 341, or both types of selective data retrieval mechanisms.

According to one embodiment, in which a data retrieval service 380 in the form of a polling service is utilized, at 514, the escrow controller 320 calls the first data store 341, e.g., via a messaging queue 382, to initiate a subscription 322 for changes in data of the logged-in user or for the activated on-line session in the first data store 341. This is shown in FIG. 3 as "data subscription requests." These data changes may involve data that has been added, deleted or updated. The subscription request 322 is provided as a set of canonically named data fields (e.g., a set of XPaths or instructions for selecting nodes from an XML document.). The escrow controller 320 may initiate a subscription 322 for any changes (new or added data, deleted data, updated data) for the specific types of data required for execution of the model 360 as specified by the specification file or escrow contract or specification file 362. The escrow controller 320 calls the polling service 380 through the message queue 382 to initiate a polling process that will poll for changes in the specified types of data in the first data store 341.

After the subscription 322 has been established, at 516, the escrow controller 320 calls the polling service 380 to initiate a polling process that monitors the first data store 341 for any changes concerning specified types of data associated with the activated on-in session. In another embodiment, which may be utilized instead of a polling service, or instead of or in conjunction with a polling service, at 518, the first data store 341, by a native data feed component, sends a data feed, which may be a continuous data feed, indicating which specified data fields had changes, to the escrow controller 320.

Continuing with FIG. 5, at 520, the selective data retrieval service 380, e.g., using a polling service for ease of explanation not limitation, periodically checks for changes of specified data fields for the active on-line session such that as polling progresses, each polling check made to determine changes relative to a prior polling check. At 522, if no change is detected, the polling service 480 continues with periodic checks for changed data in the first data store 341, but when a change is detected by the polling service 380, the escrow controller 320 is notified of the change by the polling service 380 through the message queue 382. The escrow controller 320 writes the data update to the second data store 342 or cache.

At 524, as the poller 380 checks for data changes, and data changes are cached to the second data store 342, the escrow controller 320, based on the data pre-requisites or conditions set forth in the specification file or escrow contract 362, eventually determines that the data requirements of a model 360 applicable to the logged in user have been satisfied. This event triggers the escrow controller 320 to read the required model data from the second data store 342, communicate with the model processor or execution service 370, and call the model processor 370 to execute the model 360 with the provided data that has been retrieved from the first data store 341 and that was cached to the second data store 342.

With continuing reference to FIG. 5, at 526, as noted the result 361 generated by execution of the model 360 in the form of a tax return topic or menu option ranking is returned by the model processor 370 to the escrow controller 320, which locally stores the tax return topic result 361, e.g., in the third data store 343, that is a dedicated data store for tax return topics generated by model 360 execution and that is not accessible by the on-line tax return preparation application 311. The generated tax return topic ranking 361 is stored in the third data store 343 until retrieved by the escrow controller 320 in response to a request by the online tax return preparation application 311.

Data that is analyzed relative to requirements of an escrow contract or specification file 362 is read from a single source, i.e., the second data store 342 or cache of the portion of the data in the first data store 341. In another embodiment, electronic tax return data is provided by multiple sources, and in one embodiment, this involves both the second data store 342 or cache and the on-line tax return preparation application 311, e.g., the request provided by the online tax return preparation application 311.

More specifically, in one embodiment, all of the data that is required for execution of a model 360 is retrieved from the first data store 341 via a selective data retrieval system 380, i.e., no data for model execution is received from the online tax return preparation application 311 or request thereby. Thus, in this embodiment, the escrow controller 320, via communications through the message queue 382 with the data retrieval service 380, is able to asynchronously find all of the data elements required by a model 360, cache the data to the second data store 342, and issue a call to the execution service 370 to execute a model 360 utilizing the retrieved data and to generate a decision or result 361 in the form of a tax return topic ranking. This may be done prior to the online tax return preparation application 311 issuing a request for the ranking.

According to another embodiment, the online tax return preparation application 311 requests a ranking 361 from the escrow controller 320 ("get decision" in FIG. 3), and as part of this request or subsequent communication associated with the request, provides the required data elements to the escrow controller 320. The escrow controller 320 then generates or updates an escrow record 345, which may already include data fulfilling the requirements for model 360 execution per the specification file 362, and this triggers the escrow controller 320 to issue a call to the model processor or execution service 370 to execute the model 360 utilizing the data received from the online tax return preparation application 311 to generate a result 361 in the form a tax return topic ranking, which is then returned by the escrow controller 320 to the on-line tax return preparation application 311 and may also be stored in the third data store 343 for future reference.

In a further embodiment, data that is utilized to fulfill conditions or pre-determined model 360 criteria per the specification file 362 is received from multiple sources such that systems implement a "hybrid" type data retrieval system. In one embodiment, a first portion of the data required for model 360 execution is retrieved from the first data source 341, and a second portion of the data required for execution of that model 360 is received from the online tax return preparation application 311, e.g., as part of the request ("get decision" in FIG. 3). According to one embodiment, a majority of the required data is retrieved from the first data source 341, whereas a much smaller portion of data is supplied by the online tax return preparation application 311. Further, according to one embodiment, the data supplied by the online tax return preparation application 311 is the final piece of data required before a call can be made by the escrow controller 32 to the model processor 370 in order to execute the model 360 with the collected or retrieved data.

Figure 6:
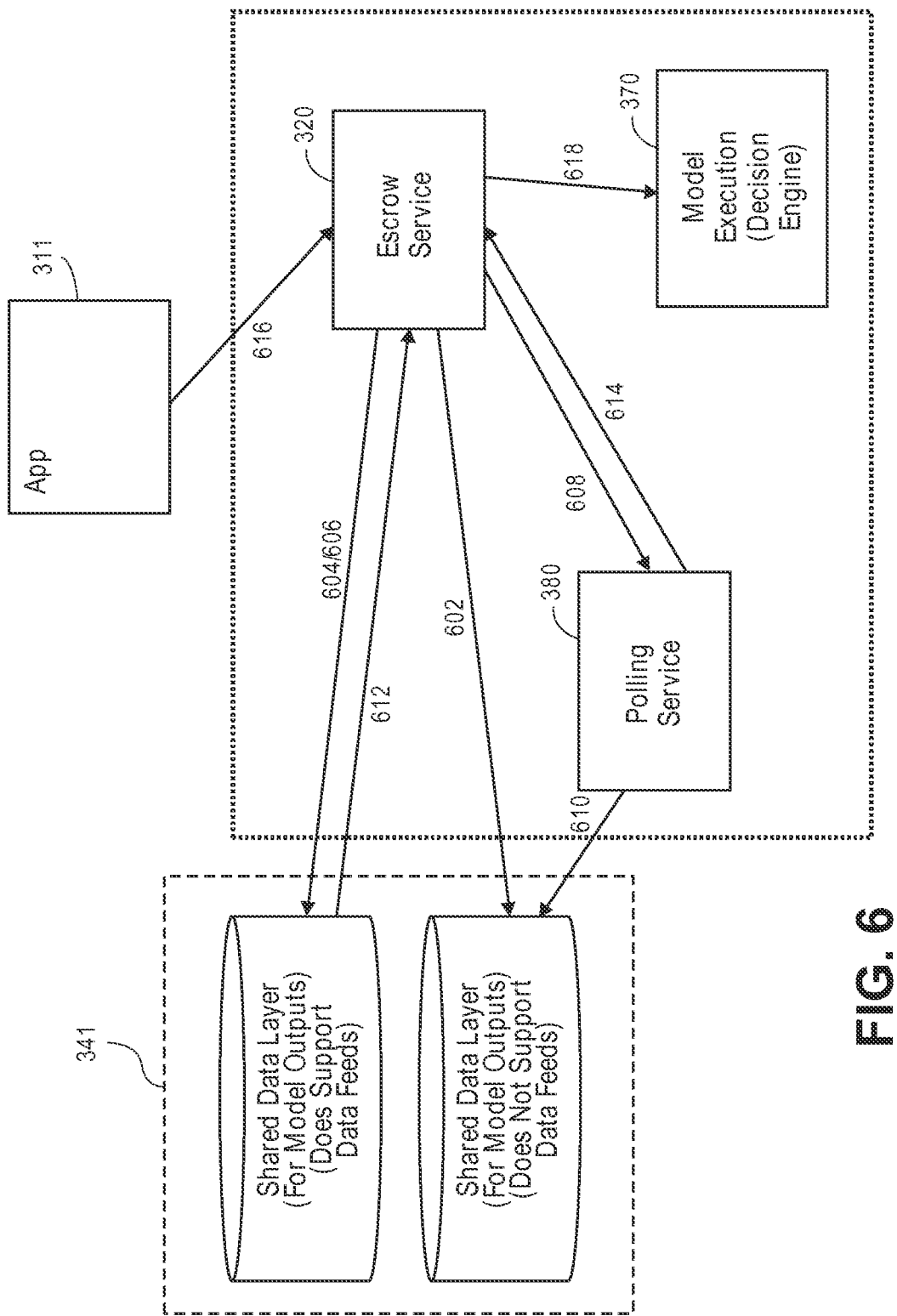
FIG. 6 is a system flow diagram illustrating how components shown in FIG. 3 can operate in a mode in which model execution to generate a tax return topic ranking is based in part upon selected data retrieved from a persistent data store managed by an online tax return preparation application and selected data received from or derived from a request for a tax return topic ranking made by an online tax return preparation application.

For example, referring to FIG. 6, at 602, the escrow controller 320 accesses the first data store 341 or runtime persistence via communications made to the data retrieval service 380 through the message queue 382 to retrieve or pull data elements for a model 360 as specified by the escrow contract 362 and for a user that is currently logged into the online tax return preparation application 311. The escrow contract 362 specifies which data is required for model 360 execution, which data is options, and the location of such data in the second data store 342.

At 604, the escrow controller 320 retrieves or pulls the data from the second data store 342 or cache to update or complete an escrow record 345 that is stored in the second data store 342. This is repeated for each distinct data store that the escrow controller 320 accesses or manages for this purpose, and in the illustrated embodiment, there is a single data store, i.e., the second data store or cache 342. At 606, the escrow controller 320 calls the first data store 341 to initiate a subscription 322 for any changes (adds, updates, deletes) to only those data fields specified by the model 360/escrow contract 362, and at 608, the escrow controller 320 calls the polling service 480 to initiate a polling process that will poll for data changes/additions on behalf of the user for the user's on-line session. At 610, in embodiments involving use of data feeds rather that a polling service, the data feed of the first data store 341 may send a continuous feed to the escrow controller 320 to notify the escrow controller 320 of changes that occurred to the data fields of the first data store 341 during a particular on-line session and involving a particular user. As noted above, for systems that do not provide for an automatic data feed, a polling service 480 may be utilized, and at 612, the polling service 480 polls the first data store 341, e.g., periodically. Each poll request is a request for changes to any data fields that have occurred since the last time the poll request was made.

At 614, when the polling service 480 detects a change, a notification of that change is sent to the escrow controller 320. Thus, according to one embodiment, at this stage, some, but not all, of the data required for model 360 execution has been collected. At 616, at a later time, the online tax return preparation application 311 issues a request ("get decision" in FIG. 3) to the escrow controller 320 for a tax return topic ranking 361. The request includes the remaining data elements that are required for model 360 execution.

At 618, the escrow controller 320 utilizes a combination of the data elements from the request received from the online tax return preparation application 311 and the data of the escrow record 345 of the second data store 342 such that requirements for model 360 execution per the specification file or escrow record 362 have now been fulfilled. This triggers escrow controller 320 to call the model processor 370 to execute the associated model 360 ("decision computation" in FIG. 3), resulting in generation of a result 361 in the form of tax return topic ranking. This ranking 361 is provided to the online tax return preparation application 311 in response to the request and may be stored to the third data store 343 by the escrow controller 320 for future reference.

It will be understood that data requirements for a model 360 may be fulfilled in different ways during an on-line session, which may involve various updates to the first data store 341 and various requests made by the online tax return preparation application 311. For example, for an on-line session for a particular user, a first request for a tax return topic ranking 361 may involve a model 360 that is executed with only data retrieved from the first data store 341, whereas during the same on-line session, a second request for a tax return topic ranking 361 may involve a model 360 that is executed with data from both the first data store 341 and data of or derived from the request made by the online tax return preparation application 311.

The system is configured such that the current or most recent tax return ranking 361 applicable to an interview screen 112 or tax return topic ranking 361 is stored, but the resulting rankings that may have been generated by execution of prior versions of the same model 360 may also be stored in the third data sore 343, e.g., for reference to allow developers to see how different model 360 versions perform. Thus, for a first interview screen 112-1, the third data store 343 may store a current ranking of tax return topics that is based on the most recent execution of the model 360 (version 3), but also store prior versions (version 2, version 1) of the model 360 and/or resulting tax return rankings 361 in the third data store 343 (but not in at least the first data store 341). This may be done for each logged-in user or each on-line session, but unlike the data in the second data store 342, which is temporary data cached from the first data store 341 for a particular on-line session, the rankings/models in the third data store 343 can be stored on a permanent basis, or with persistence, or for a longer duration of time, since the second data store 342 data is based on the actual data of a temporary on-line session.

Thus, referring again to FIG. 5, at 528, when the online tax return preparation application 311 determines that a ranking 361 generated by execution of a model 360 may be required (e.g., given a first interview screen 112-1, it is known that current interview screen 112c containing rankable tax return topics 361 will be displayed or is a possible interview screen 112p that can be displayed given defined menu options), the on-line tax return preparation application 311 issues a request for the topic ranking 361 ("get decision" in FIG. 3). In response to receiving the request, the escrow controller 320 may be configured to first determine whether a tax return topic ranking 361 has already been generated and is already contained in the third data store 343 (indicated by "fetch" in the escrow controller 320 and "get decisions for immediate consumption" in FIG. 3). If so, then the generated tax return topic ranking 361 can be immediately read from the third data store 343 and provided to the online tax return preparation application 311 in response to the request. A flag can be set in the third data store 343 to indicate that the generated ranking was utilized or provided to the online tax return preparation application 311. If no topic ranking is stored in the third data store 343, then the escrow controller 320 is configured to determine whether a model 360 can be executed based on the specification file 362 indicating the data conditions for execution of a model 360 that would generate the requested topic ranking 361 and where such data can be retrieved from the third data store 341. If the data conditions have been satisfied for the model 360, the escrow controller 320 issues a call ("decision computation" in FIG. 3) to the model processor 370 together with the associated data, and the model processor 370 executes the model utilizing the received data to generate a result 361 in the form of a tax return topic ranking, which is communicated to the escrow controller 320 which, in turn, stores the generated ranking 361 to the third data store 343 and provides the determined ranking 361 to the online tax return preparation application 311 in response to the request. If there is no ranking stored in the third data store 343, and the data in the third data store 343 for the user's online session dose not satisfy the requirements set forth by the specification file 362 such that model 360 execution is premature, the escrow controller 320 can respond to the tax online preparation application 411 indicating that no other tax return topic ranking 361 is available, in response to which the online tax return preparation application 311 can use the current, original or default ranking. Thus, a current ranking 361 may replace a default or original topic ranking, thus resulting in an interface transformation by modifying one interview screen 112/user experience into a different interview screen 112/user experience. A current ranking 361 also replace or modify a previously generated ranking 361. Or, if the escrow controller 320 does not respond to the request, thus resulting in timing out of the request, the online tax return preparation application 311 may continue to utilize the current, original or default ranking for the interview screen 112.

At 530, the user eventually logs out from the tax return preparation application 311, thus terminating the on-line session, and for this purpose, the online tax return preparation application 311 may issue a call to the logout service 552 to terminate the on-line session and at 532, notify the escrow controller 320 regarding the terminated session (indicated by "signal user session . . . end" in FIG. 3). With the on-line session terminated, the escrow controller 320 is now able to delete the escrow record 345 from the second data store 342, thus clearing the data from the prior on-line session. This ensures when or if the user logs in again, the current tax return data for that particular user can be read from the first data store 341 and the additional processing is not performed on data that is not involved in a currently active on-line session. In contrast to the second data store 342, the rankings and data of executed models 360 (and versions thereof) may be maintained in the third data store 343 for future reference or for use during a future on-line session.

While certain embodiments involving "automated" ranking system component interactions and data retrieval have been described, other embodiments involve "semi-automatic" interaction, meaning that the on-line tax return preparation application 311 is involved in when data is retrieved from the first data store 341 such that the online to return preparation application 311 acts as a "trigger" that would normally be performed by a listener on a data feed. In "semi-automated" embodiments, the online tax return preparation application 311, at specific points in time during preparation of an electronic tax return, sends a "heartbeat" message to the escrow controller 320. In response, the escrow controller 320 initiates a re-scan of the first data store 341 for purposes of determining whether an escrow record 345 should be updated for that user/on-line session and based on the escrow record 345 content relative to the specification file or escrow record 362 applicable to a model 360, whether the escrow controller 320 can proceed with executing any models 360 for which data is read and for which data requirements have been fulfilled.

Figure 7:
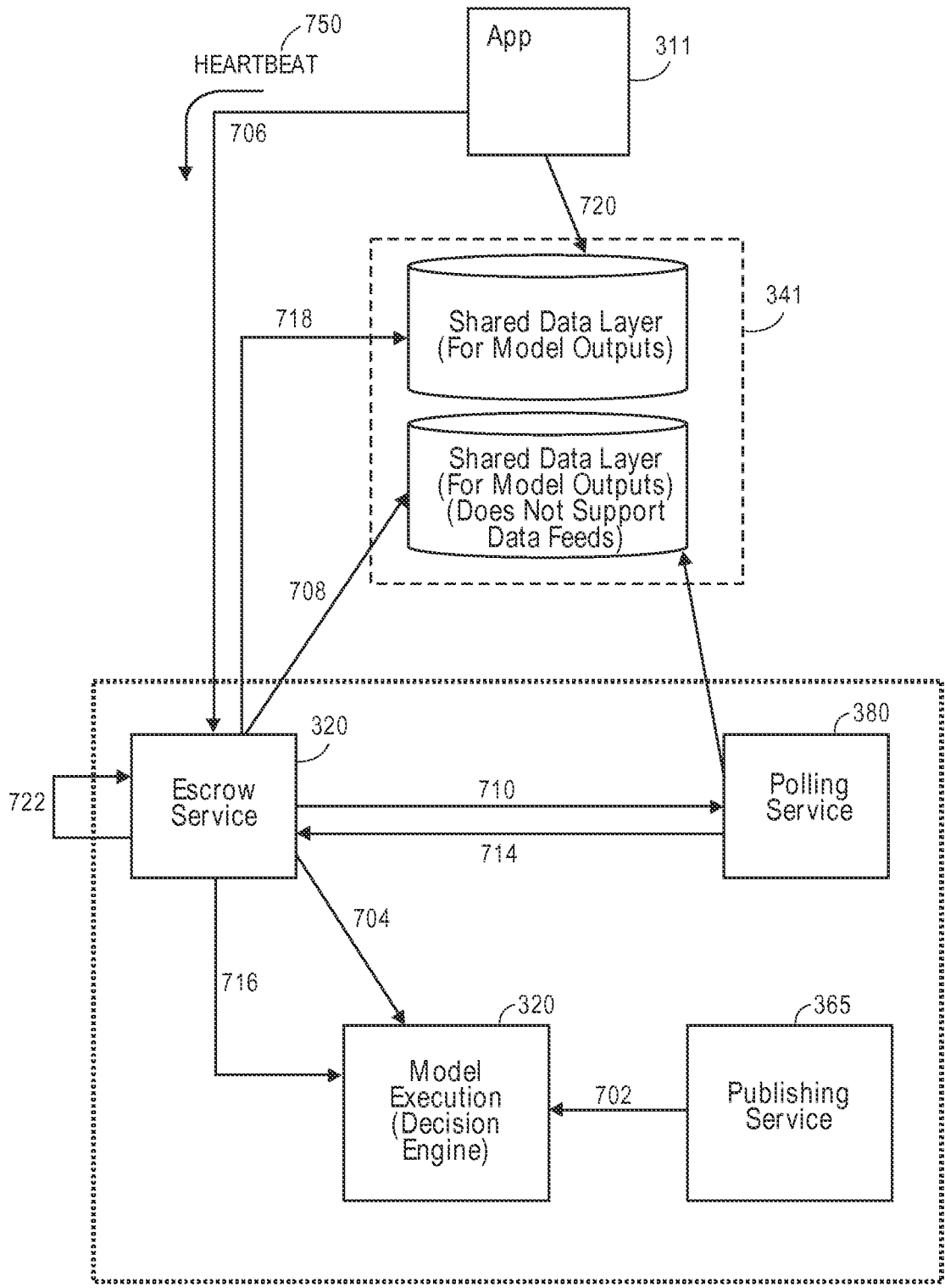
FIG. 7 is a system flow diagram illustrating how components shown in FIG. 3 can operate in a mode in which the online tax return preparation application sends "heartbeat" signals to trigger analysis of data for execution of a model to generate a tax return topic ranking.

One manner in which these types of "heartbeat" or application 311 trigger embodiments may be implemented is described with reference to FIG. 7, various aspects of which have been described above, and various details of which are not repeated.

At 702, as described above with reference to FIGS. 3-6, a model 360 is published 365 and pushed to the model processor or execution service 370, and at 704, the escrow controller 320 periodically calls the model processor 370, in response to which the model processor 370 returns data about published and live models 360. At 706, at various appropriate points during the electronic tax return preparation process (e.g., when the user has reached a certain current interview screen 112c of a pre-determined sequence of screens 112, or it is possible, given current navigation, that the user may proceed to a certain navigation screen 112p), the online tax return preparation application 311 calls the escrow controller 320 and transmits a 'heartbeat" or "check status" message 750 to the escrow controller 320. This "heartbeat" message 750 identifies the user (e.g., by authld or use name) and their credentials (e.g., ticket or password). At 708, in response to the heartbeat message 750, the escrow controller 320 accesses the second data store 342 to retrieve whatever data elements for a model 360 are available for that particular user or specific on-line session, and at 710, the escrow controller 320, through the message queue 382, calls the data retrieval service 380 to initiate a polling process. The polling process can periodically check the first data store 341 for data changes/additions made during the on-line session. At 712, in response to the escrow controller's 320 call, the polling service 380 checks the first data store 341 at some regular interval, and each poll request is a request for changes to any data fields that have occurred since the last time the poll request was made. At 714, when the polling service 380 detects a change, the polling service 380, through the message queue 382, transmits a message to the escrow controller 320 to notify the escrow controller 320 of the change. The changed data is cached or temporarily stored to the second data store 432. At 716, when the escrow controller 320 determines that the escrow record 345 stored in the second data store 342 including the first data store 341 changes fulfills the input requirements of the decision model 360 and that the model 360 can be executed per the specification file 362, the escrow controller 320 issues a call to the model processor 370 together with the requisite data read from the escrow record 345 in the second data store 342 to execute the model 360, and the generated result 361 in the form of a tax return ranking is provided by the model processor 370 to the escrow controller 320 and stored to the third data store 343 at 718. At 720, when the online tax return application 311 needs or may need the generated ranking 361 (e.g., based on an interview screen 112 to be displayed next or that may be possibly displayed given a current interview screen 112 or sequence of questions to be presented), the online tax return preparation application 311 issues a request for the tax return topic ranking 361 to the escrow controller 320, which reads the tax return topic ranking 320 for that user that was previously generated from the third data store 343, and responds to the request by providing the tax return topic ranking 361 to the online tax return preparation application 311. At 722, eventually, heartbeat calls 750 or checks to the escrow controller 320 for the active on-line session/user are terminated, or will not be issued after a pre-determined amount of time, in response to which the escrow controller 320 can terminate the polling service 380 and delete the escrow record 345 from the second data store 343 since the on-line session has been terminated.

One manner in which an escrow controller 320 may be configured for embodiments, including embodiments involving heartbeat message 750 applications, is described with reference to FIG. 8. One embodiment of an escrow controller 320 includes or utilizes a foreground thread pool 850 and a background thread pool 852 that are utilized to process heartbeat requests 750 and interface with the escrow records 345 in the second data store 342. A foreground thread pool 850 is a pool of processes that works to receive the incoming heartbeat requests 750, or a "request for future work" from the online tax return preparation application 311 and forwards the necessary instructions to the background thread pool 852. Foreground refers to work that is done will the calling application waits for the response, whereas background refers to what will be done at some time later, without the calling application needing to wait. Thus, the application 311 that sends the heartbeat signal 750 can receive a rapid response while "heavier" work is scheduled to be done later, such as initializing a cache or escrow record 342 and initializing a poller 380 (in the case of the very first heartbeat signal 750 received for a user) or keeping alive an existing cache or escrow record 342 and an existing poller 380 (in the case of a subsequent heartbeat signal 750 received for a user).

Pools include collection of executable elements, such as computer executable elements, such as threads. A thread is a component of a process and is the smallest sequences of programmed instructions that can be managed independently by a scheduler, which is typically a part of the operating system. Multiple threads can exist within the same process and may execute concurrently and share resources. On a single processor, multithreading is generally implemented by time slicing or multitasking, and the CPU switches between different software threads. On a multiprocessor or multi-core system, multiple threads can be executed in parallel or at the same time, with every processor or core executing a separate thread simultaneously. The size of the pool is usually the number of concurrent users.

The background thread pool 852 is a pool of threads that performs asynchronous or background tasks consisting of creation and modification messages to a Java Message Service (JMS) broker, creation and modification of each unique escrow records 345, and decision engine or escrow controller 320 execution requests. A thread pool is a pre initialized collection of Java threads, and threads are small independent executable 'processes' capable of doing work without coordinating with another process. The size of the background thread pool 852 is the ratio of average task completion time of the foreground thread pool 850 divided by the average task completion time of the background thread pool 852.

Figure 8:
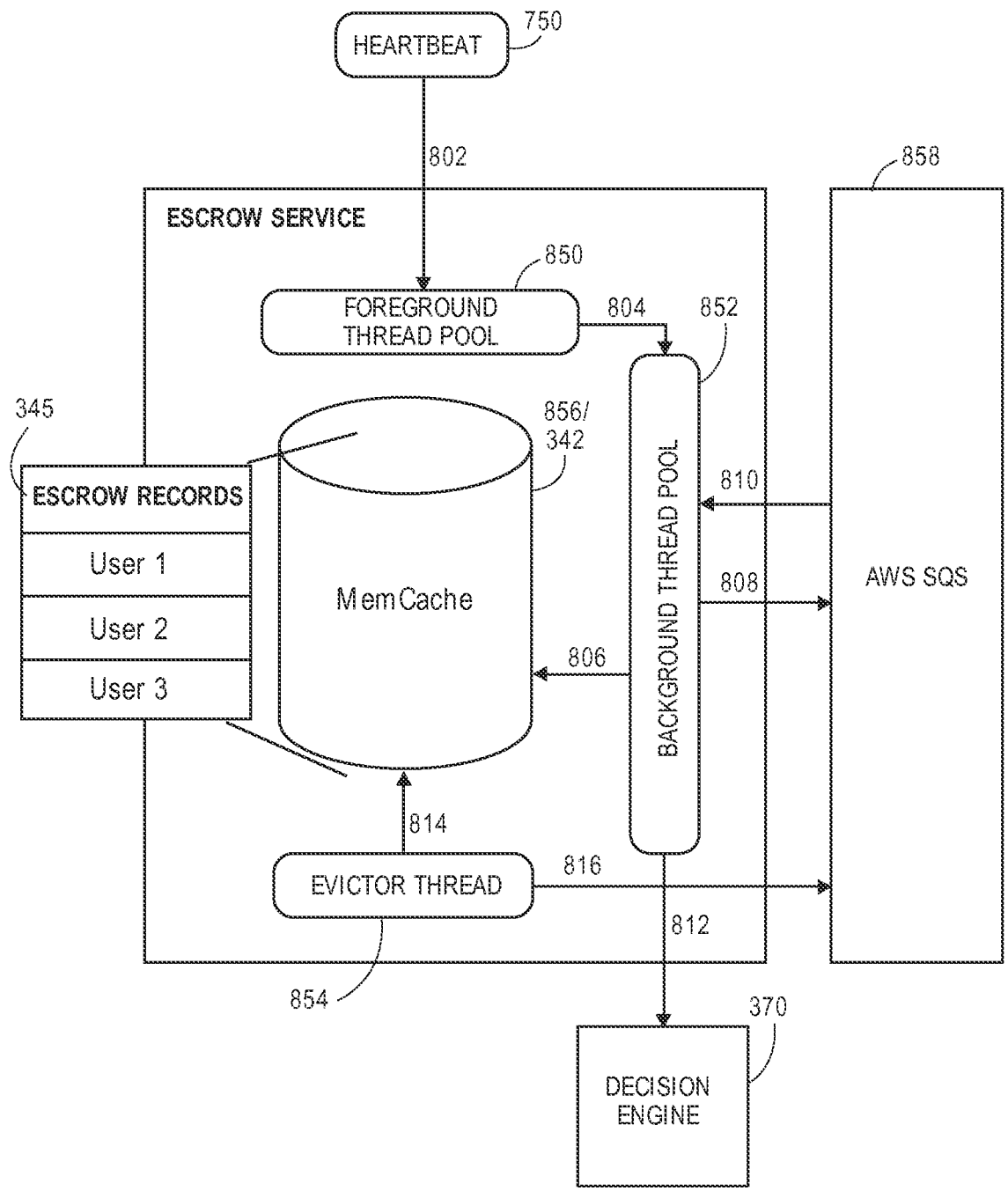
FIG. 8 is a system flow diagram illustrating one manner in which an escrow controller can be configured and operate according to embodiments involving a "heartbeat" signal and thread pools.

In FIG. 8, MemCache refers to the cache or second data store 342 utilized by the escrow service or escrow controller 320. The second data store 342 includes escrow records 345 and data about user activity such as unique user identifiers and timestamp data of activity. An evictor thread 854 manages dormant escrow records 342 and the proper sizing of the background thread pool 852. Dormant records 354 are records for which the system has not received a heartbeat signal 750 in some pre-determined amount of time. When an escrow record 342 is dormant, it is deleted and its worker is deleted to result in "cleaning up" of at the end of a user's session of data that was created when the on-line session was initiated.

With continuing reference to FIG. 8, involving embodiments involving heartbeat signals 750 sent by the online tax return preparation application 311, at 802, during an active on-line session, the online tax return preparation application 311 sends a "heartbeat" or "check" message 750 to the escrow controller 320 to notify the escrow controller 320 that the on-line session is still active, and upon receiving the heartbeat message 750, the foreground thread pool 850 of the escrow controller 320 quickly responds to the online tax return preparation application 311 with a "success" indicator. At 804, further instructions are forwarded by the foreground thread pool 850 to the background thread pool 852 for asynchronous processing.

At 806, the background thread pool 852 checks MemCache 856 (the cache or second data store 834) to determine whether a unique escrow record 345 has been created, and if not, then one is created and stored to the MemCache 856/second data store 342. At 808, upon each escrow record 345 creation, the background thread pool 852 sends instructions to Java Message Service (JMS) brokers to create poller 380.

At 810, JMS brokers respond to the background thread pool with further instructions regarding data that has been requested. Resources that may be utilized for this purpose include, for example, Amazon Web Services (AWS)/Simple Queue Service (SQS) 858 available from Amazon Web Services, Inc. The Amazon SQS Java Messaging Library is a JMS interface to Amazon SQS that enables leveraging of Amazon SQS in applications that utilize use JMS, and the interface allows use of Amazon SQS as the JMS provider.

At 812, whenever an escrow record 845 is completed, the background thread pool 852 calls the model processor or execution service 370 (also referred to as decision engine in FIG. 8) to generate a result 361 in the form of a tax return topic ranking. At 814, the evictor thread 854 loops through the escrow records 345 and actively monitors the second data store/cache 342 for any dormant escrow records 345, and at 816, if a dormant escrow record is detected, the evictor thread 854 initiates termination of the poller 380, the escrow record 345, and resizing of the background thread pool 852. This is done in order to recover resources created when a user's session was initiated, rather having a result of increasing resource consumption over time.

Figure 9:
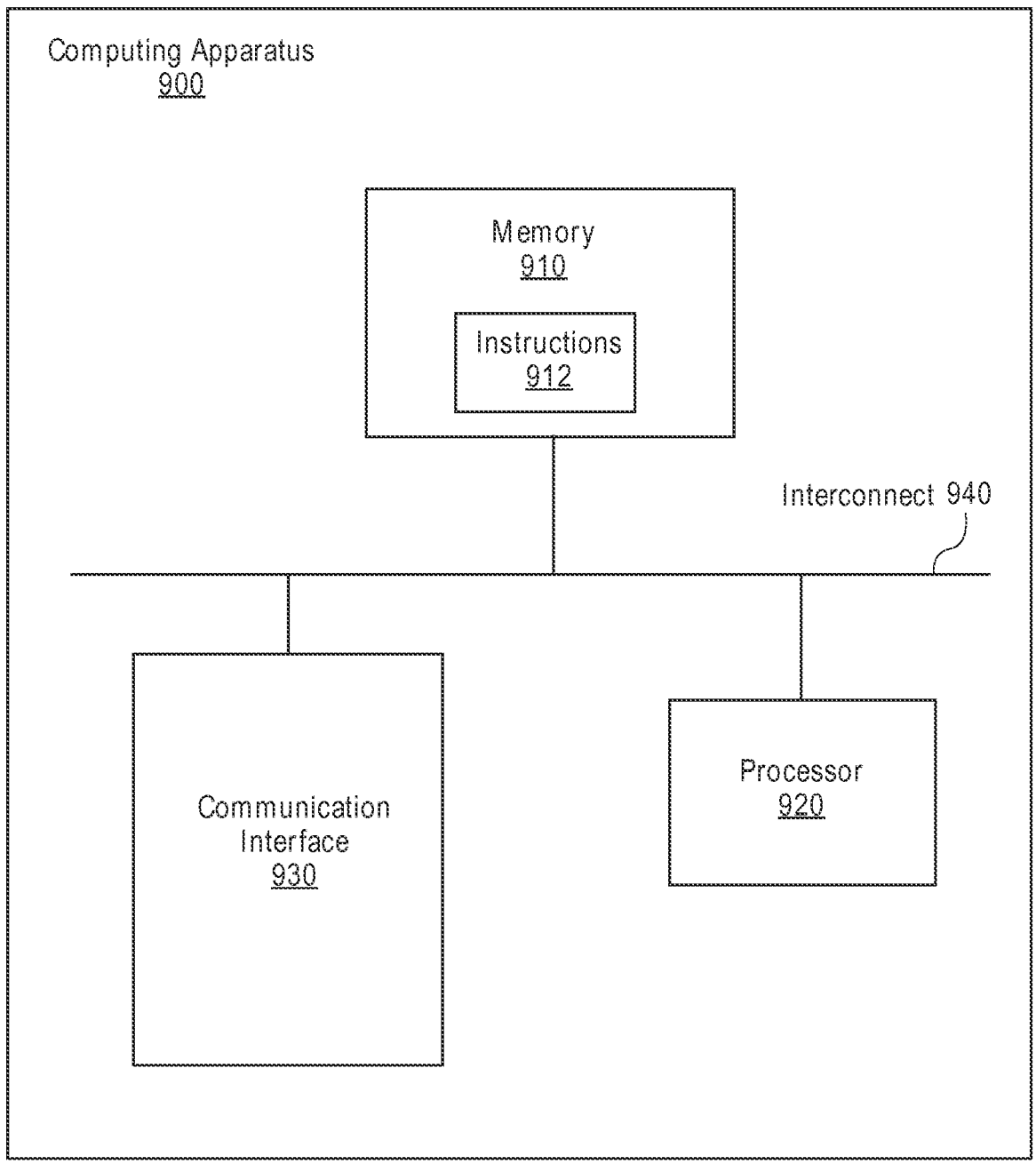
FIG. 9 is a block diagram of components of a computer system that may be programmed or configured to execute embodiments.

FIG. 9 generally illustrates certain components of a computing device 900 that may be utilized or that that system components include for execution of various computer instructions according to embodiments. For example, the computing device may include a memory 910, program instructions 912, a processor or controller 920 to execute instructions 912, a network or communications interface 930, e.g., for communications with a network or interconnect 940 between such components. The memory 910 may be or include one or more of cache, RAM, ROM, SRAM, DRAM, RDRAM, EEPROM and other types of volatile or non-volatile memory capable of storing data. The processor unit 920 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 940 may include a system bus, LDT, PCI, ISA, or other types of buses, and the communications or network interface may, for example, be an Ethernet interface, a Frame Relay interface, or other interface. The network interface 930 may be configured to enable a system component to communicate with other system components across a network which may be a wireless or various other networks. It should be noted that one or more components of computing device 900 may be located remotely and accessed via a network. Accordingly, the system configuration provided in FIG. 9 is provided to generally illustrate how embodiments may be configured and implemented, and it will be understood that embodiments may also involve communications through one or more networks between a user computer and a computer hosting system embodiments of on-line or cloud based tax return preparation applications Method embodiments or certain steps thereof, some of which may be loaded on certain system components, computers or servers, and others of which may be loaded and executed on other system components, computers or servers, may also be embodied in, or readable from, a non-transitory, tangible medium or computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 920 performs steps or executes program instructions 912 within memory 910 and/or embodied on the carrier to implement method embodiments.

Although particular embodiments have been shown and described with reference to generating a ranking of tax return topics or menu options presented by an online tax return preparation application during preparation of an electronic tax return, it should be understood that the above discussion is not intended to limit the scope of these embodiments and that embodiments may be utilized in various other ways.

For example, given the capabilities of escrow-based personalization of platform embodiments, embodiments can be combined with a very specific kind of decision model that allows for enhanced and new AB Testing and targeted segmentation. Targeted segmentation is a capability offered by a specific kind of model that involves the model choosing, from a finite set of possible user experiences, the one user experience that should be delivered based on the state of a user's profile. Rather than starting with the premise that there is one optimal experience for everyone (as in traditional AB Testing), target segmentation with embodiments is based on the premise that there are multiple variations of a user experience, each user experience being optimal for a sub segment of the population.

This targeted segmentation model has the general property that it will assign a user to an experience if either (1) the experience has been proven to be optimal or (2) there is not enough data gathered to come to a firm conclusion. The targeted segmentation model will not assign a user to an experience if that user experience has been proven to be sub-optimal. With these types of systems, multiple variations of a user experience can quickly and safely be pushed into production, and certain variations will prove themselves to be successful as a result of increased on-line traffic, whereas other user experiences will prove themselves to be less desirable and less relevant.

In these user experience applications, a distinction is made regarding qualification versus assignment of a user experience. Embodiments distinguish between components responsible for producing a qualification and those that are responsible for producing an assignment, and this enables models 360 to be run and decisions or generates results in the form of a ranking 361 to be produced in the background and not coordinated with any direct user activity. The nature of this design means that the models are run and results produced typically well before they are actually needed by the requesting application 311 or, in other words, since the application 311 that will require the ranking 361 has not yet called to retrieve the ranking 361 and the user has not yet been affected by it, it may be the case that the resulting ranking 361 will never be consumed. Thus, by making a distinction between early qualification and just-in-time assignment, embodiments address shortcomings associated with situations in which users are assigned to an experiment and potentially never reach the portion of the application 311 that is relevant, thus providing improvements by addressing problems involving: 1. when the case of a set of experiments that are mutually exclusive with each other, there is a risk of wasting traffic/performing unnecessary communications, and a user is assigned to an experiment, disqualifying them from participating in anything else but then never collecting any useful data from that user because they never actually get to participate in the experiment they were assigned, 2. difficulty in distinguishing t users that were assigned to an experiment versus those that were assigned and actually effected by the experiment, and 3. difficulties for the escrow controller to known whether or not a better assignment could be produced when potentially more data becomes available at some later phase.

Figure 10A:
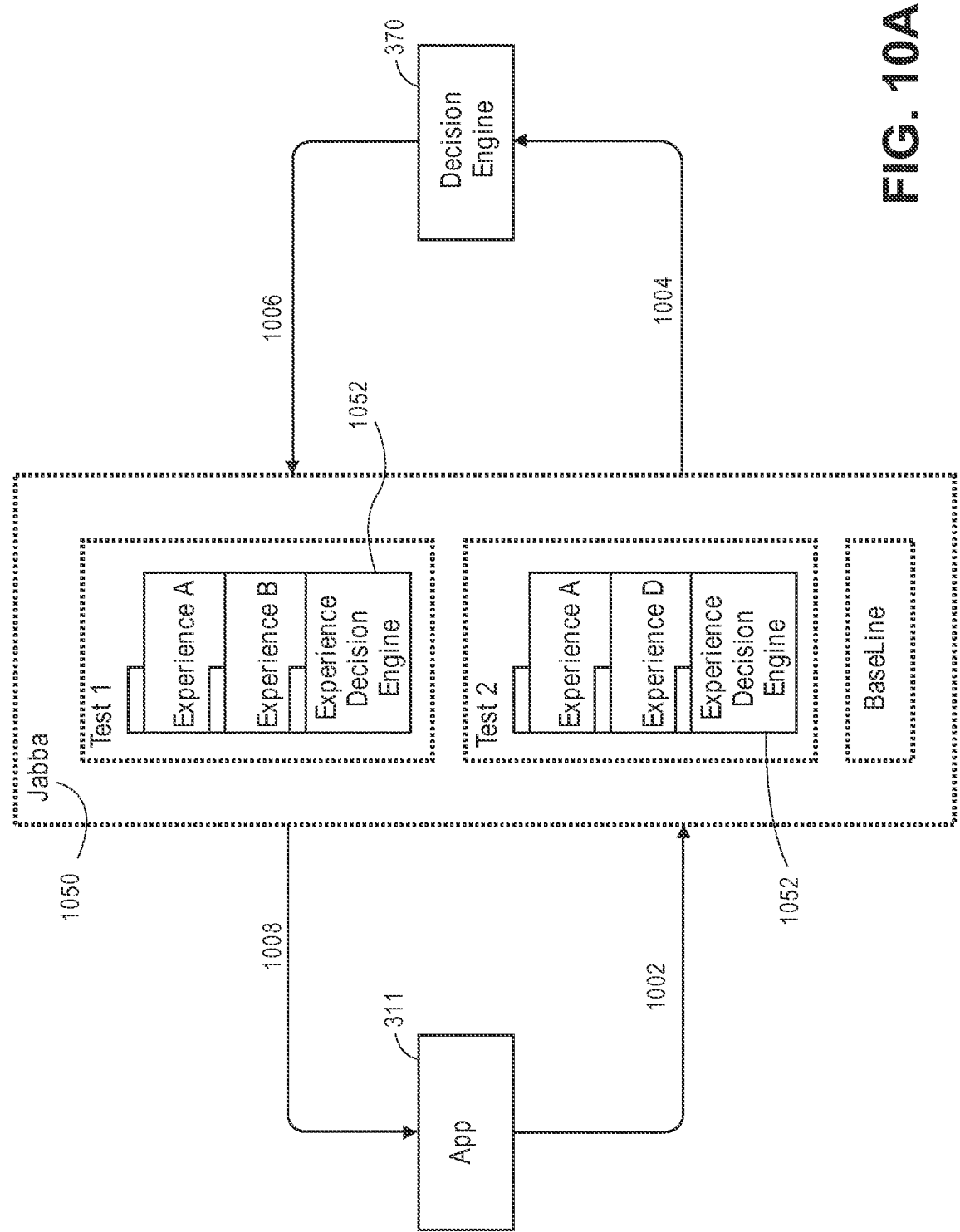
FIGS. 10A-B are system flow diagrams illustrating embodiments that are utilized to determine personalization experiences.
Figure 10B:
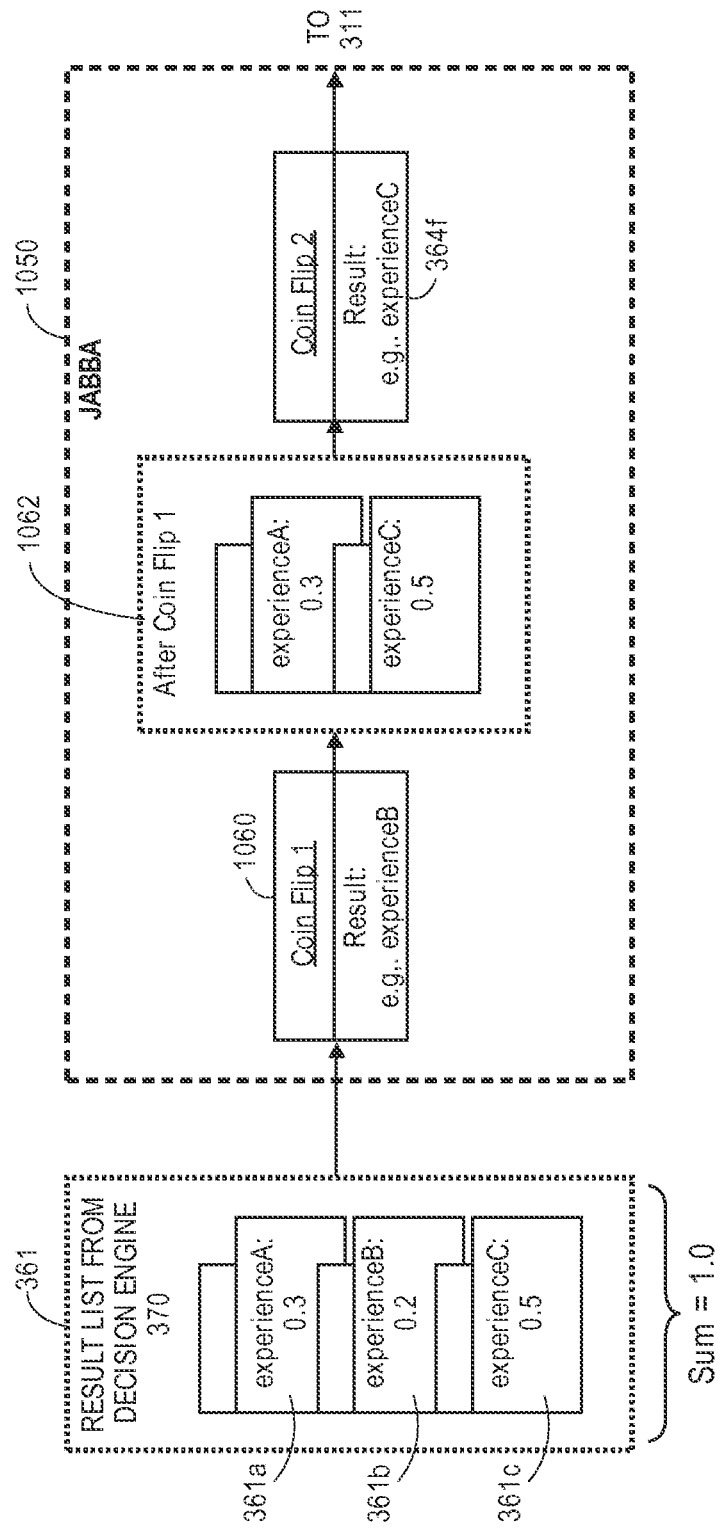

FIGS. 10A-B are system flow diagram illustrating how user experiences may be processed according to embodiments, i.e., how personalized experience flow would be implemented, and involves an experience management system that manages an experience set and products an experience assignment by considering a set of experience qualifications and performing any additional last minute checks that validate criteria (e.g., mutual exclusion rules). An experience set is defined as including elements including or involving traffic allocation percentage, a set of named variations that are members of the set, a set of other Experience Sets with which this one is mutually exclusive, a simple predicate that further determines the experiment eligibility of a participant, and a reference to the Experiment Qualification Mode Referring to FIG. 10, for implementation of a successful personalized experience interaction, at 1002, the application 311 (such as online tax return preparation application, but general "application") makes a call to Jabba 1050 or another external system that assigns users to one of many equivalent experiences that can benefit from escrow-based ranking embodiments, with a unique identifier of the user and any valid JSON object as inputs to the experimentation mode, and at 1004, Jabba 1050 receives the request. Based on the established rules, Jabba 1050 determines which test and experience to call or serve. If the chosen experience is Experience Decision Engine 1052 (rather than "Baseline" or the current best performing experience from a set of equivalent experiences), then Jabba 1050 makes a request to Decision Engine 370:

```
POST /<ENDPOINTNAME>/<MAJORVERSION>
{
    "identifier": //String. Unique identifier for the user. e.g., an authid of
    ivid (server or client)
    "data": //Any valid JSON object,
    "tid": //String. Optional. A unique value provided by the client for
    tracking this transaction
    "identiferType": //String optional, represents the type of identifier
    passed. The only allowed values are AUTH_ID, IVID_SERVER,
    IVID_CLIENT. If no value is passed, we'll assume AUTH_ID
}
example:
POST /jabbaModel
{
    "identifier": "sadfsadfsdafsdafsdf",
    "data": {
    "asdf": "sdf"
    },
    "tid": "string",
    "identiferType": "IVID_SERVER"
}
```

At 1006, the decision engine 370 consumes the request and responds back to Jabba 1050 with a list of "buckets" with probabilities that sum 1054 to 1.0:

```
RESPONSE
{
    "data": //Any valid JSON object ,
    "model": "fooModel-1.4" //String. The endpoint name, major
    version and minor version of the model
    "tid": //String. The unique value used to track this transaction
}
example:
RESPONSE
{
    "tid":"string",
    "data":{"experienceA":0.3,"experienceB":0.2,"experienceC":0.5},
    "model":"jabbaModel-1.0"
}
```

At 1008, Jabba 1050 then "flips a coin" 1060 on the options 261a-c that the decision engine 370 has provided to return an ordered list 1062 of options.

Referring to FIG. 10B, after the ordered list 1062 of options is obtained, Jabba 1050 then applies business rules to determine the final experience 361f ("f" referring to "final") to serve back to the application 311. The business rules are rules that define or constrain some aspect of business and always resolve to either true or false. An example of a business rule might be given experience A, B, and C, new users are not allowed to see experience B, thus experienceC should be shown to the user even though experienceB might have higher priority on the Jabba Result List.

While a successful personalized experience interaction is described above, it may be the case that there is an error while trying to process the request made from Jabba 1050 to the decision engine (involving 1004 and 1006 as described above). An example of a decision error message follows:

```
REQUEST:
POST /jabbaModel
{
    "data": {
    "asdf": "sdf"
    },
    "tid": "string",
    "identiferType"; "IVID_SERVER"
}
RESPONSE:
{"errorMessage":"Cannot evaluate Decision Model with endpoint
jabbaModel because DataInDto.identifier is null"}
```

As a result of this situation, Jabba swallows the error message, and responds to let the application team choose which experience to serve to the user.

It may also be the case that the decision engine 370 is unreachable, in which case Jabba 1050 also responds to permit the application team choose which experience to serve to the user. It may also be the case that Jabba 1050 is unreachable. This may occur when the application 311, for whatever reason, cannot communicate with Jabba 1050, and in this situation, the application team can decide which experience to serve to the user.

Thus, while embodiments and variations of the many aspects of the invention have been disclosed and described herein, such disclosure is provided for purposes of explanation and illustration only. Thus, various changes and modifications may be made without departing from the scope of the claims.

Further, where methods and steps described above with reference to various system-flow diagrams indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process as well as performed sequentially. Thus, the methods shown in various system-flow diagrams are not intended to be limited to a particular sequential order, unless otherwise stated or required.

Accordingly, embodiments are intended to exemplify alternatives, modifications, and equivalents that may fall within the scope of the claims.

What is claimed is:

1. A computerized tax return preparation system, comprising:
   an on-line tax return preparation application accessible by user computing devices executing browsers to prepare electronic tax returns of, the on-line tax return preparation application being configured to write electronic tax return data to a first data store; and
   a tax return topic ranking system in communication with the on-line tax return preparation application and the first data store, the tax return topic ranking system being operable independently of the on-line tax return preparation application and configured to:
      retrieve from the first data store specified types of electronic tax return data from in-progress tax return calculations of users logged into the tax return preparation application;
      create escrow records for users including data describing the in-progress electronic tax return calculations of specified types of logged-in users;
      store escrow records to a second data store;
      in response to the data describing the in-progress electronic tax return calculations of at least one escrow record satisfying pre-determined criteria, execute a model utilizing the specified electronic tax return data of the at least one escrow record to generate a tax return topic ranking and provide the generated tax return topic ranking to the on-line tax return preparation application; and
      generate an interview screen including tax return topics structured according to the generated tax return topic ranking,
      wherein the interview screen is presented through a screen of a computing device of the logged-in user associated with the at least one escrow record.

2. The system of claim 1, the tax return topic ranking system further comprising a third data store different from the first data store and the second data store, the tax return topic ranking system being configured to store the generated tax return topic ranking to the third data store before the generated tax return topic ranking is provided to the on-line tax return preparation application.

3. The system of claim 2,
   wherein the on-line tax return preparation application can write data to and read data from the first data store, but the on-line tax return preparation application cannot write data to or read data from the second data store or the third data store.

4. The system of claim 1,
   wherein the on-line tax return preparation application can write data to and read data from the first data store, but the on-line tax return preparation application cannot write data to or read data from the second data store.

5. The system of claim 1, the model being a predictive model selected from the group consisting of:
   logistic regression;
   naive bayes;
   k-means classification;
   K-means clustering;
   other clustering techniques;
   k-nearest neighbor;
   neural networks;
   decision trees;
   random forests;
   boosted trees;
   k-nn classification;
   kd trees;
   generalized linear models; and
   support vector machines.

6. The system of claim 1,
   wherein multiple models are available for execution for an individual logged-in user.

7. The system of claim 1, where multiple models are published or activated for execution by the tax return topic ranking system, and the second data store includes escrow records generated for models for each logged-in user.

8. The system of claim 1, the tax return topic ranking system being configured to receive from the on-line tax return preparation application data indicating that a user has logged into the on-line tax return preparation application, wherein the tax return topic ranking system is activated for a user in response to the data indicating that the user has logged on to the on-line tax return preparation application.

9. The system of claim 1, the tax return topic ranking system being configured to receive from the on-line tax return preparation application data indicating that a user has logged off from the on-line tax return preparation application, wherein the tax return topic ranking system is terminated for that user in response to the data indicating that the user has logged off from the on-line tax return preparation application.

10. The system of claim 1, the tax return topic ranking system being configured to receive a request for a tax return topic ranking from the on-line tax return preparation application during preparation of the electronic tax return for a logged-in user.

11. The system of claim 10, in response to the request, the tax return topic ranking system being configured to:
    determine identification data of the logged-in user; and
    access a third data store different from the first data store and the second data store to determine whether a tax return topic ranking was previously generated for the identified logged-in user.

12. The system of claim 11, when a tax return topic ranking is not stored in the third data store for the identified user, the tax return topic ranking system being configured to determine whether escrow record data of the identified user in the second data store satisfies pre-determined criteria.

13. The system of claim 10, when the logged-in user's escrow record data in the second data store satisfies pre-determined criteria for a model, the tax return topic ranking system being configured to execute the model utilizing the logged-in user's escrow record data to generate a tax return topic ranking, and provide the generated tax return topic ranking to the on-line tax return preparation application in response to the request.

14. The system of claim 10, when the logged-in user's escrow record data in the second data store does not satisfy pre-determined criteria for a model, the tax return topic ranking system being configured to wait for the escrow record to be updated such that the pre-determined criteria is satisfied, and the corresponding model can be executed.

15. The system of claim 14, the tax return topic ranking system being configured to respond to the request by notifying the on-line tax return preparation application that no generated tax return topic ranking is available.

16. The system of claim 11, the tax return topic ranking system being configured to retrieve a previously determined tax return topic ranking that was previously determined by execution of a model in response to the request by the on-line tax return preparation application and stored in the third data store, the previously determined tax return topic ranking being provided to the on-line tax return preparation application in response to the request.

17. The system of claim 1,
wherein a generated tax return topic ranking is presented to at least one logged-in user but not all logged-in users of the on-line tax return preparation application.

18. The system of claim 1,
wherein multiple users are logged in to the tax return preparation application, and escrow records are generated based on portions of user data in the first data store and stored to the second data store.

19. The system of claim 18,
wherein multiple models are activated or published for execution by the tax return topic ranking system, and
wherein, for each logged-in user, an escrow record is generated for each user-model combination and includes specified types of electronic tax return data associated with models.

20. The system of claim 1,
wherein the tax return topic ranking system is configured to execute different models based on escrow records of logged-in users.

21. The system of claim 20,
wherein a first model is executed for a first escrow record of a first user to generate a first tax return topic ranking, and a second model different from the first model is executed for a second escrow record of a second user to generate a second tax return ranking different from the second tax return ranking.

22. The system of claim 1,
wherein the escrow record satisfying the pre-determined criteria for model execution includes electronic tax return data stored in a single source, the single source comprising the second data store.

23. The system of claim 1,
wherein the escrow record satisfying the pre-determined criteria for model execution includes electronic tax return data from multiple sources, at least one of the multiple sources comprising the second data store.

24. The system of claim 23, at least one of the multiple sources comprising the on-line tax return preparation application,
wherein data of a request for a tax return topic ranking transmitted by the on-line tax return for a tax return topic ranking is stored to the second data store and satisfies at least a portion of the pre-determined criteria.

25. The system of claim 1, the tax return topic ranking system being further configured to monitor the first data store for changes in the in-progress electronic tax return calculations of the logged-in user.

26. The system of claim 25, the tax return topic ranking system being configured to modify a logged-in user's escrow record in the second data store based at least in part upon a change of the logged-in user's data in the first data store.

27. The system of claim 25,
wherein an escrow record is modified by deleting electronic tax return data from the escrow record based on the electronic tax return data being deleted from the first data store, replacing electronic tax return data in the escrow record with different electronic tax return data retrieved from the first data store, or adding electronic tax return data retrieved from the data store to the escrow record.

28. The system of claim 25, the tax return topic ranking system comprising a polling service configured to periodically check the first data store for changes in the specified types of electronic tax return data.

29. The system of claim 26, the tax return topic ranking system being configured to determine whether electronic tax return data of a modified escrow record satisfies the pre-determined criteria, and when the electronic tax return data of the modified escrow record satisfies the pre-determined criteria, re-execute the model utilizing the updated electronic tax return data of the modified escrow record, re-execution of the model generating a different tax return topic ranking.

30. The system of claim 26, the tax return topic ranking system being configured to determine whether electronic tax return data of a modified escrow record satisfies second pre-determined criteria associated with a second model different from a first model, and when the electronic tax return data of the modified escrow record satisfies the second pre-determined criteria, execute a different, second model utilizing the electronic tax return data of the modified escrow record, execution of the second model generating a different, second tax return topic ranking.

31. The system of claim 1, the tax return topic ranking system being configured to retrieve a portion of the electronic tax return data of the logged-in user that is stored in the first data store for an escrow record to be generated and stored in the second data store.

32. The system of claim 1, the tax return topic ranking system being configured to execute the model asynchronously relative to the on-line tax return preparation application writing electronic tax return data to the first data store.

* * * * *